(12) United States Patent
Maeda et al.

(10) Patent No.: US 7,907,320 B2
(45) Date of Patent: Mar. 15, 2011

(54) MICROMIRROR DEVICE WITH A SINGLE ADDRESS ELECTRODE

(75) Inventors: Yoshihiro Maeda, Hachioji (JP); Fusao Ishii, Menlo Park, CA (US); Hirokazu Nishino, Akishima (JP); Kazuma Arai, Tokyo (JP)

(73) Assignees: Silicon Quest Kabushiki-Kaisha (JP); Olympus Corporation (JP)

( * ) Notice: Subject to any disclaimer, the term of this patent is extended or adjusted under 35 U.S.C. 154(b) by 434 days.

(21) Appl. No.: 12/072,450

(22) Filed: Feb. 25, 2008

(65) Prior Publication Data

US 2008/0204845 A1  Aug. 28, 2008

Related U.S. Application Data

(60) Provisional application No. 60/903,467, filed on Feb. 26, 2007.

(51) Int. Cl.
*G02B 26/08* (2006.01)
(52) U.S. Cl. .................................... 359/224.1
(58) Field of Classification Search ..... 359/223.1–226.1
See application file for complete search history.

(56) References Cited

U.S. PATENT DOCUMENTS

| | | | |
|---|---|---|---|
| 5,061,049 A | 10/1991 | Hornbeck | |
| 5,579,151 A | 11/1996 | Choi | |
| 6,543,286 B2 * | 4/2003 | Garverick et al. | 73/514.18 |
| 6,856,068 B2 | 2/2005 | Millere et al. | |
| 6,859,580 B2 | 2/2005 | Staple et al. | |
| 7,026,695 B2 | 4/2006 | Yang et al. | |
| 7,453,621 B2 | 11/2008 | Novotny | |
| 2005/0099670 A1 | 5/2005 | Kimura et al. | |
| 2005/0117196 A1 | 6/2005 | Kimura et al. | |
| 2006/0132892 A1 | 6/2006 | Huibers | |
| 2006/0177957 A1 | 8/2006 | Patel et al. | |
| 2006/0187517 A1 | 8/2006 | Ljungblad | |
| 2006/0279496 A1 | 12/2006 | Ogikubo et al. | |
| 2007/0007849 A1 | 1/2007 | Ogikubo et al. | |
| 2007/0053052 A1 | 3/2007 | Pan | |

* cited by examiner

*Primary Examiner* — Euncha P Cherry
(74) *Attorney, Agent, or Firm* — Bo-In Lin

(57) ABSTRACT

A micromirror device comprises a plurality of mirrors arranged on a substrate, an elastic hinge for supporting each mirror to be deflectable, an address electrode having first and second regions arranged across the deflection axis of each mirror, a driving circuit for controlling a deflection of the mirror, and a stopper provided in a position of making contact with the mirror in a deflected state of the mirror. When the mirror makes contact with the stopper, the potential of the mirror or the stopper changes.

13 Claims, 21 Drawing Sheets

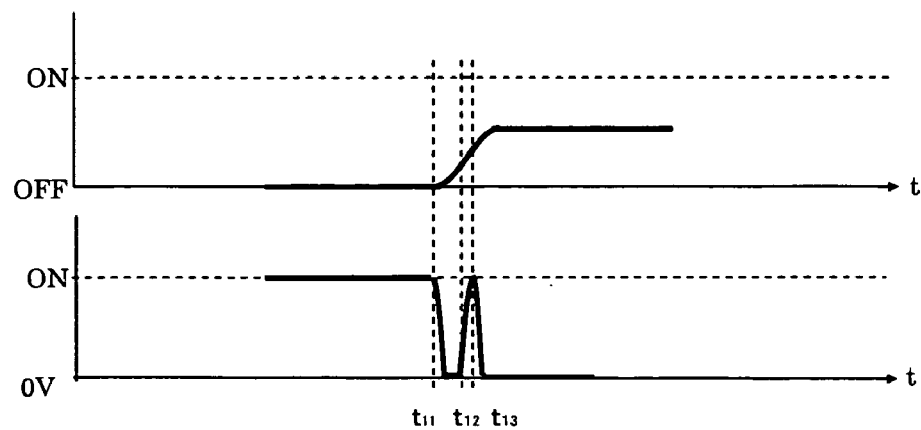
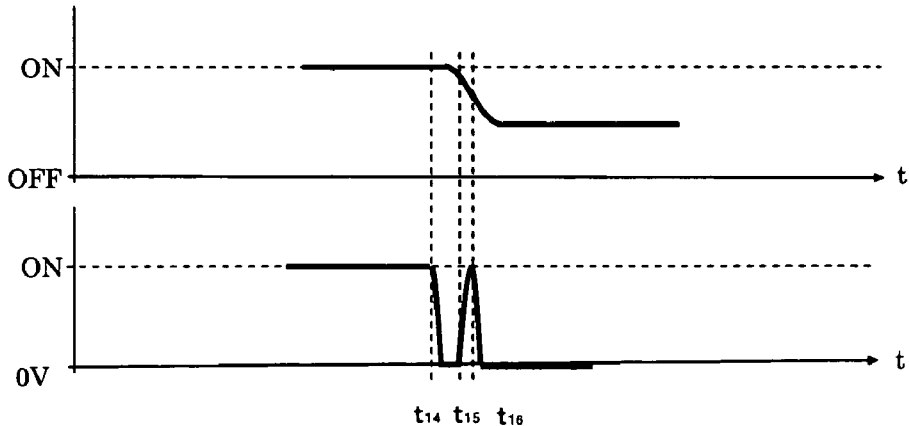

Mirror position

Mirror position

Mirror position

Electrode voltage

Mirror position

Mirror position

Electrode voltage

MICROMIRROR DEVICE WITH A SINGLE ADDRESS ELECTRODE

This application is a Non-provisional application claiming a Priority date of Feb. 26, 2007 based on a previously filed Provisional Application 60/903,467 filed by the common Applicants of this application and the disclosures made in Provisional Application 60/903,467 are further incorporated by reference.

BACKGROUND OF THE INVENTION

1. Field of the Invention

The present invention relates to a technology involving micromirror devices. More particularly, this invention relates to micromirror devices using mirror elements each controlled with a single address electrode.

2. Description of the Related Art

A micromirror is a microscopic mirror used in reflecting light. A deflectable micromirror device (DMD), that is, one composed of display elements implemented with a micro electromechanical system (MEMS) device configuration where an electric circuit is integrated on a silicon substrate and many micromirrors are arranged on the flat surface of the substrate, is generally known as a device using micromirrors. One can change the deflection angle of a micromirror surface on a conventional DMD by applying a voltage to two address electrodes positioned below each micromirror to generate a coulomb force F. Note that "deflection" referred to in this specification indicates the tilt of a micromirror surface. FIG. 1 is a circuit diagram that shows two driving circuits configured with memory cells with an SRAM configuration, which are connected to two address electrodes according to the conventional method.

A DMD is composed primarily of a substrate, a plurality of micromirrors, address electrodes used in deflecting the angle of the micromirrors, and elastic hinges for supporting each of the micromirrors. The elastic hinges are arranged on the substrate to support the micromirrors. In one mirror element, two address electrodes are situated immediately below each micromirror on the substrate. These address electrodes are connected to an external circuit via driving circuits on the substrate, whereby voltages are applied to the address electrodes.

U.S. Pat. No. 5,285,407 discloses the driving circuits configured for the two address electrodes in one mirror element of a DMD. To control the micromirror of the mirror element, the deflection of each micromirror is achieved by generating coulomb Forces F between the micromirror and the address electrodes, with voltages applied to the address electrodes via the driving circuits. Since the elastic hinges support the micromirrors, the flat surface of each micromirror is normally held in the position of the initial state by the restoring force of each elastic hinge when there is no control voltage applied to the electrodes.

U.S. Pat. No. 5,214,420 discloses the projection system using the above-described DMD. This projection system controls light by reflecting incident light on or away from a projection optical path by deflecting each micromirror as described above. In this patented disclosure, the light almost entirely reflected on a projection optical path, and light reflected away from the projection optical path are referred to as ON light and OFF light respectively. Additionally, light partially reflected on the projection optical path, which is light reflected on the projection optical path at a particular ratio of the ON light to the OFF light, that is, light the quantity of which is smaller than that of the ON light is referred to as intermediate light in this specification.

However, DMDs employed in the configurations disclosed by the above-described patents require two address electrodes for one mirror element. Therefore, it is necessary to connect two driving circuits to the two address electrodes. This leads to the technical problem of the relatively large surface area taken up by the driving circuits connected to the address electrodes on the substrate. Accordingly, when many mirror elements must be arranged on the substrate in order to obtain an image with a high-definition resolution, such as hi-vision, the area occupied by the driving circuits on the substrate expands with an increase in the number of mirror elements, leading to an increase in the size of the substrate itself. As a result, the projection apparatus becomes larger and more expensive.

U.S. Pat. No. 6,266,178 discloses the driving circuit 21 connected to an address electrode on a substrate by using a memory cell with a DRAM configuration as a charge storage cell. Namely, U.S. Pat. No. 6,266,178 discloses the invention for downsizing the driving circuit 21 by using the charge storage cell 20 shown in FIG. 2A.

FIG. 2B shows the configuration of the two driving circuits 21 that use the charge storage cell 20 and are connected to the two address electrodes in one mirror element. However, in this scenario, the technical problem described above, in that the size of the substrate itself must be increased due to the large area occupied by the driving circuits on the substrate when many mirror elements are arranged to obtain an image with a high-definition resolution, remains.

U.S. Pat. No. 6,975,444 discloses the configuration for controlling a mirror element with one address electrode with a DRAM or SRAM configuration. This document discloses the embodiment where a mirror connected to a cover glass is deflected in only one direction with respect to a substrate.

U.S. Pat. No. 6,885,494 discloses the technology related to the deflection angle of a mirror element. U.S. Pat. No. 4,229,732 discloses the configuration where a hinge is situated on a mirror surface. U.S. Pat. No. 5,061,049 discloses the landing electrode with the same potential as a mirror. U.S. Pat. No. 5,671,083 discloses the memory configuration using a capacitor. U.S. Pat. No. 6,657,759 discloses the technology for holding a mirror at a predetermined angle.

As described in these patents above, in a DMD where two electrodes are provided on a substrate in one mirror element, the two driving circuits required for each of the two address electrodes occupy a large area on the substrate because the configuration of the two driving circuits corresponding to the two address electrodes is required. This imposes a severe restriction on the arrangement of a larger number of mirror elements on the substrate. Additionally, previous to this invention, there have been no methods for controlling one mirror element with a single address electrode in a micromirror device. Furthermore, there have been no methods disclosed for controlling a mirror element to deflect in two directions with high precision.

SUMMARY OF THE INVENTION

A micromirror device according to a first preferred embodiment of the present invention is a micromirror device configured by arranging on a substrate a plurality of mirror elements each comprising a mirror, an elastic hinge for supporting the mirror to be deflectable, an address electrode having first and second regions arranged across the deflection axis of the mirror, a driving circuit that is connected to the address electrode and controls a deflection of the mirror, and a stopper provided in a position of making contact with the mirror in a deflected state of the mirror, wherein the potential of the mirror or the stopper changes when the mirror makes contact with the stopper.

The change of the potential of the mirror or the stopper is used as a timing signal for controlling a pulse signal, or as a reference signal such as a reset signal, etc. of the device.

A micromirror device according to a second preferred embodiment of the present invention is a micromirror device configured by arranging on a substrate a plurality of mirror elements each comprising a mirror deflectable with respect to the substrate, an elastic hinge, a potential change electrode which is provided in a position of making contact with the mirror, and the potential of which changes along with the mirror when making contact with the mirror, and a driving circuit that is connected to the potential change electrode, and controls the mirror.

Also in this case, the change of the potential of the potential change electrode or the mirror is used as a timing signal for controlling a pulse signal, or as a reference signal such as a reset signal, etc. of the device.

A micromirror device according to a third preferred embodiment of the present invention is a micromirror device configured by arranging on a substrate a plurality of mirror elements each comprising a mirror, an elastic hinge for supporting the mirror to be deflectable, an address electrode arranged between the mirror and the substrate, a driving circuit connected to the address electrode and to the mirror via the elastic hinge, and a potential change electrode arranged between the mirror and the substrate, wherein the voltage of any of the potential change electrode, the mirror, and the address electrode changes when the mirror makes contact with the potential change electrode.

In this case, the change of the voltage of any of the potential change electrode, the mirror, and the address electrode is used, whereby the change of the voltage can be used as a reference signal for various types of controls performed in the micromirror device.

BRIEF DESCRIPTION OF THE DRAWINGS

FIG. 6D is a chart that exemplifies a method for controlling the micromirror to change from the OFF light state to the intermediate light state, that is, the initial state, in the case where the area sizes of the first and the second electrode parts differ in the single address electrode of a mirror element in the micromirror device, according to the present invention;

FIG. 6E is a chart that exemplifies a method for controlling the micromirror to change from the ON light state to the intermediate light state, that is, the initial state, in the case where the area sizes of the first and the second electrode parts differ in the single address electrode of a mirror element in the micromirror device according to the present invention;

DESCRIPTION OF THE PREFERRED EMBODIMENTS

The present invention discloses micromirror devices that include a plurality of mirror elements, with each mirror element controlled by a single address electrode and one driving circuit connected to the address electrode on a substrate.

Figure 3:
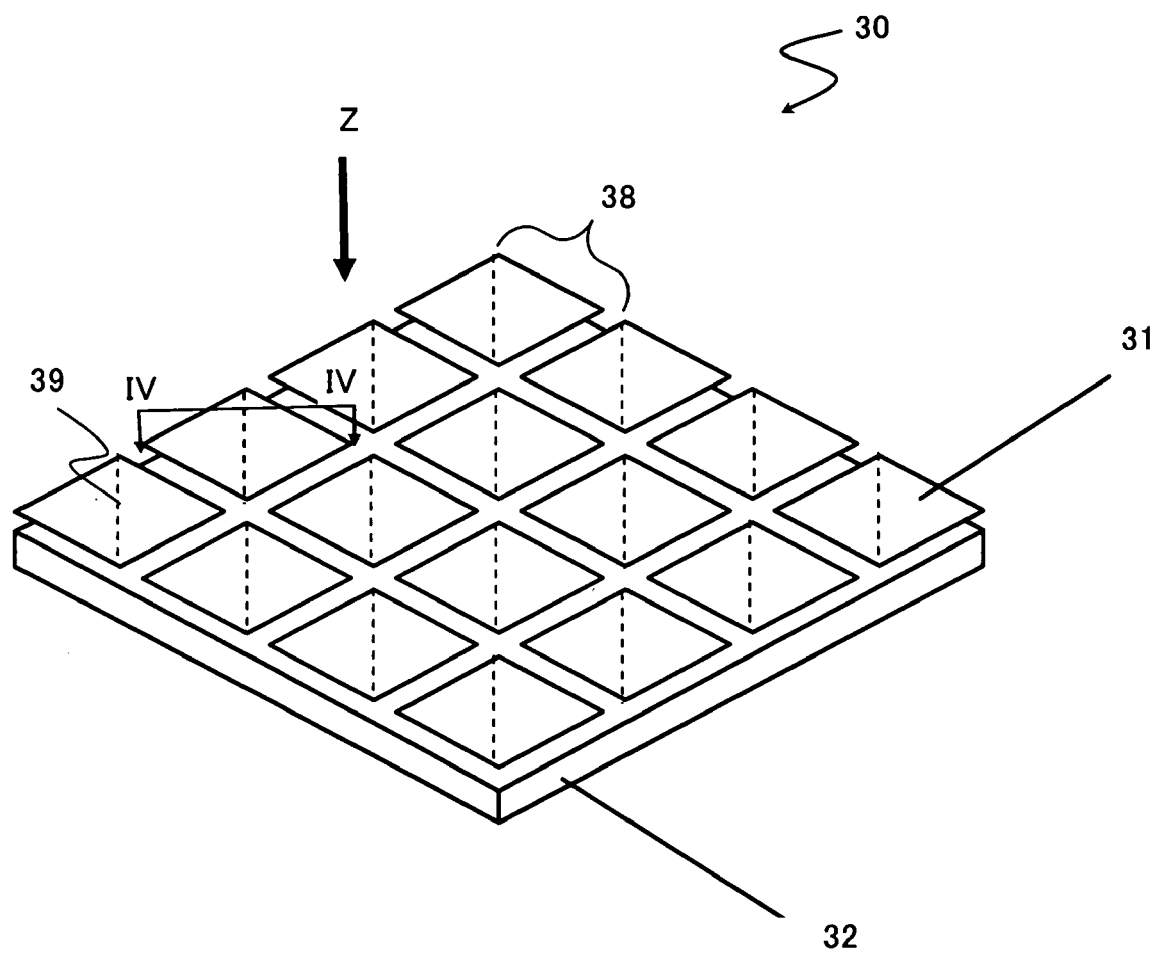
FIG. 3 is a perspective view of mirror elements that are two-dimensionally arranged on a substrate in a micromirror device, according to a preferred embodiment of the present invention.

FIG. 3 is a perspective view of the micromirror device 30 according to the present invention where a plurality of mirror elements 38 is two-dimensionally arranged on a substrate 32. As shown in FIG. 3, the micromirror device 30 is fundamentally formed by two-dimensionally (vertically and horizontally) arranging on a substrate 32 the mirror elements 38 each composed of an address electrode (not shown), an elastic hinge (not shown), and a micromirror 31 supported by the elastic hinge. According to the present invention, a single address electrode in each mirror element 38 controls the micromirror 31. The micromirror 31 may be square, or some other similar shape. Preferably, the size of the micromirror 31 (or the pitch between the centers of the mirrors) is 4 μm to 10 μm, in consideration of the number of pixels ranging from 2K×4K of super hi-vision to the number of pixels of hi-vision, and the size of the micromirror device. More preferably, the size (or the pitch between the centers of the mirrors) of the micromirror 31 is 4 μm to 8 μm.

FIG. 3 shows the configuration where the square mirror elements 38 are vertically and horizontally arranged at predetermined intervals on the substrate 32. However, the intervals between the mirror elements are not always required to be predetermined intervals. It is preferable, though, that the number of micromirrors 31 and driving circuits, which drive the micromirrors 31, are arranged on the substrate 32 ranging from 1,000,000 for hi-vision to 8,000,000 for super hi-vision of 2K×4K. In FIG. 3, a deflection axis 39 for deflecting each mirror is represented with a dashed line.

A mirror element 38 in a micromirror device 30 according to the present invention is described in detail below with reference to the cross-sectional view of the mirror element 38 taken along the line IV-IV in the micromirror device 30 shown in FIG. 3.

First Preferred Embodiment

Figure 4A:
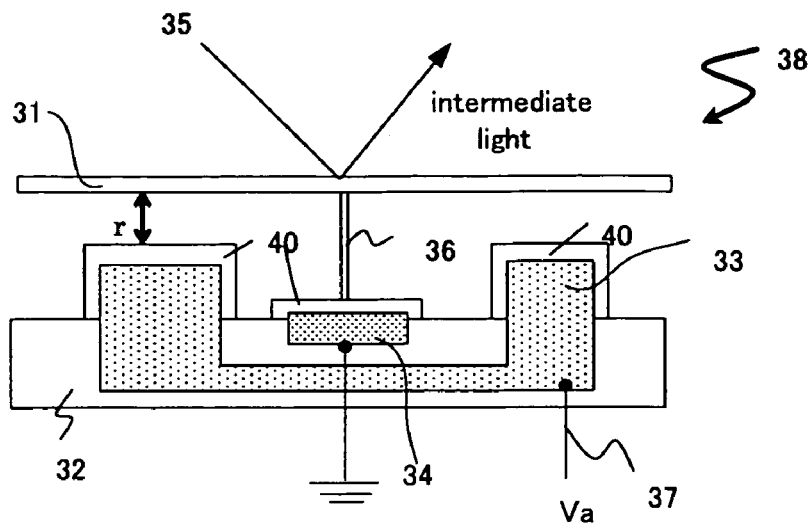
FIG. 4A is a cross-sectional view of a mirror element in an initial state taken along a line IV-IV of FIG. 3 in the micromirror device, according to the preferred embodiment of the present invention.

FIG. 4A is a cross-sectional view of the mirror element 38 held in the initial state taken along the line IV-IV of FIG. 3 in the micromirror device according to the present invention. The configuration and the initial state of one mirror element in the micromirror device according to the present invention are described below with reference to FIG. 4A. In this configuration of one mirror element in the micromirror device according to the present invention, an insulation layer 40 is provided on a substrate 32. The mirror element also includes one driving circuit 37, for driving the micromirror, and one elastic hinge 36, which is situated on the insulation layer 40. The elastic hinge 36 supports one micromirror 31, and an address electrode 33 connected to the driving circuit 37 is situated below the micromirror 31. The address electrode 33 and the driving circuit 37, which is connected to the address electrode 33, electrically control the micromirror 31. The elastic hinge 36 is connected to a hinge electrode 34 through an opening (not shown) in the insulation layer 40. The hinge electrode 34 is grounded or held at a predetermined voltage. One mirror element of the micromirror device, according to the present invention, is configured as described above. Arranging multiple mirror elements 38, as described above, on the substrate 32, as shown in FIG. 3, can configure a micromirror device.

In this invention, the right and the left regions of the single address electrode, which protrude from the substrate and are positioned on both sides of the elastic hinge or the deflection axis of the micromirror, are referred to as first and second electrode parts, respectively, unless otherwise noted, and a coulomb force is generated between the first or the second electrode part and the micromirror by applying a voltage to the address electrode 33. The use of the term, "applying a voltage", referred to in this specification, is a paraphrase of changing a potential to a predetermined waveform.

The coulomb forces vary depending on the right and the left regions of the micromirror, and, in this way, the micromirror can be deflected to the right and the left sides of the elastic hinge and the deflection axis. When the micromirror is deflected to the right and the left sides of the deflection axis, it is preferable that the angles formed between the mirror surface and the vertical axis of the substrate in the position of the elastic hinge are symmetrical with respect to the vertical axis of the substrate in the position of the elastic hinge.

In the mirror element 38, the micromirror 31 is formed, for example, with a metal of high reflectivity, or a dielectric multi-layer film, and the whole or part (such as the root, the top, and a middle portion) of the elastic hinge 36 for supporting the micromirror 31 is formed with a metal having a restoring force or a semiconductor material such as Si, etc. In this specification, the elastic hinge 36 is described based on the assumption that the elastic hinge 36 is implemented as a cantilever type and has elasticity for enabling the micromirror 31 to freely oscillate. The elastic hinge 36 can be implemented as a composite configuration composed of a torsion hinge and a cantilever or simply as a torsion hinge. For the address electrode 33, for example, Al, Cu, or W, etc. may be used as a conductor. For the insulation layer 40, SiO2, SiC, Si, etc. are available. As the substrate 32, an 8-inch Si wafer is may be utilized.

Figure 4B:
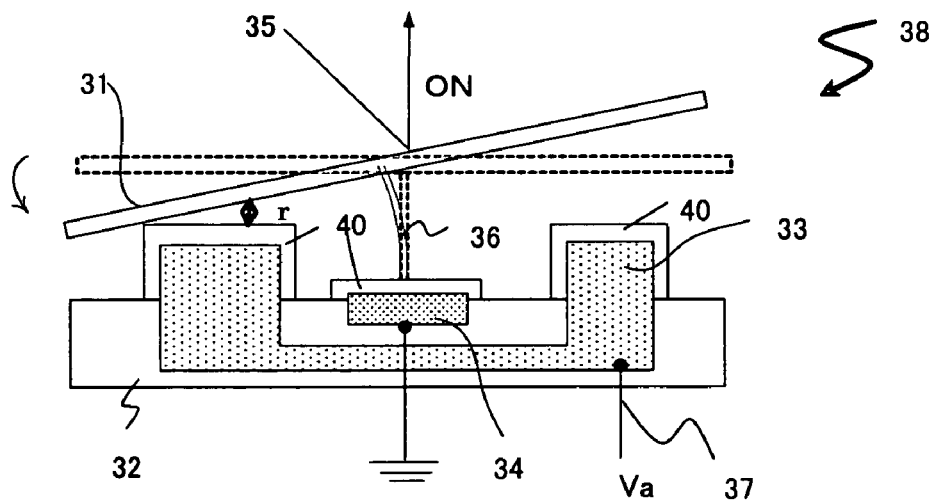
FIG. 4B is a cross-sectional view of the mirror element shown in FIG. 4A and held in an ON light state.
Figure 4C:
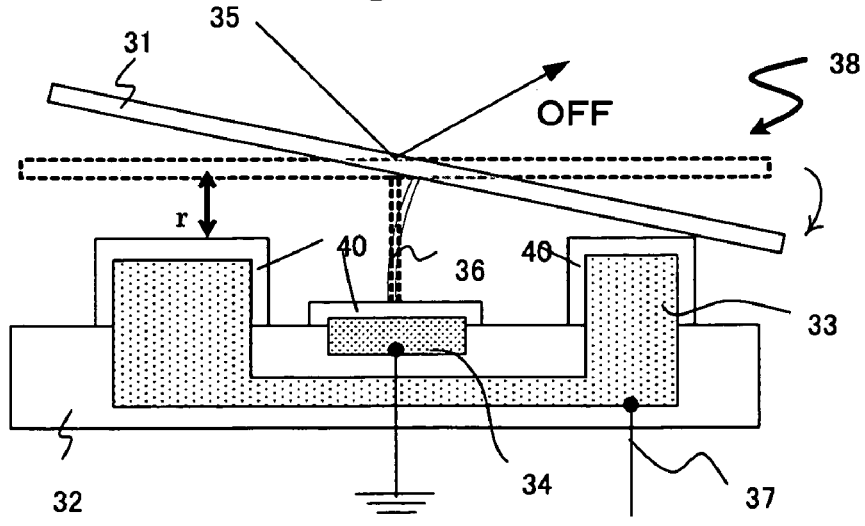
FIG. 4C is a cross-sectional view of the mirror element shown in FIG. 4A and held in an OFF light state.

The materials and the shapes of the constituent elements of the micromirror device, according to the present invention disclosed in this specification, may be varied depending on the purpose. The configuration and the controlling method shown in FIGS. 4A to 4E are described based on the assumption that the size of the right and the left regions of the single address electrode 33 and the micromirror 31 are configured asymmetrically with respect to the elastic hinge and the deflection axis As is evident from the cross-sectional view of one mirror element shown in FIG. 4A and taken along the line IV-IV of FIG. 3, the initial state of the micromirror device 30 is the state in which the micromirror 31 is supported in a horizontal position to the substrate 32. FIGS. 4A to 4C are described below based on the assumption that the initial state is the intermediate light state.

FIG. 4B is a cross-sectional view of the mirror element 38 shown in FIG. 4A, which is held in the ON light state, in the micromirror device, according to one preferred embodiment of to the present invention. In FIG. 4B, coulomb forces F are applied between the first electrode part and the corresponding region of the micromirror 31, and between the second electrode part and the corresponding region of the micromirror 31 by applying a voltage to the address electrode 33 in the initial state of FIG. 4A. However, if the area size of the second electrode part is larger than that of the first electrode part, the Coulomb force applied between the second electrode part and the corresponding region of the micromirror 31 becomes higher than that of the Coulomb force applied between the first electrode part and the corresponding region of the micromirror. Accordingly, the micromirror 31 tilts to the side of the second electrode part. The deflection of the micromirror 31, whereby incident light can be reflected as ON light, is changed by applying the voltage to the address electrode 33 as described above.

FIG. 4C is a cross-sectional view of the mirror element shown in FIG. 4A and held in the OFF light state in the micromirror device, according to one preferred embodiment of the present invention. In FIG. 4B, the micromirror 31 freely oscillates with the elasticity of the elastic hinge 36. This oscillation is achieved by stopping the voltage applied to the address electrode 33 when the micromirror 31 is held in the ON light state. During the free oscillation, the micromirror 31 moves between the deflection angles for the ON light and the deflection angle for the OFF light.

The OFF light state is obtained by the timely reapplication of the voltage to the address electrode 33 when the distance r between the freely oscillating micromirror and the OFF light side, that is, the first electrode part of the address electrode 33, is at a minimum. Coulomb forces F are applied between the first electrode part and the corresponding region of the micromirror, and between the second electrode part and the corresponding region of the micromirror. The Coulomb force F is inversely proportional to the square of the distance. Therefore, the coulomb force applied between the first electrode and the corresponding region of the micromirror is more intense than that of the force applied between the second electrode part and the corresponding region of the micromirror because the area size of the second electrode part is larger than that of the first electrode side when the distance between the first electrode part and the corresponding region of the micromirror decreases, and the distance between the second electrode part and the corresponding region of the micromirror increases. Accordingly, the micromirror 31 is drawn to the side of the first electrode part and contacts the address electrode 33, whereby the micromirror is held in this position and the OFF light is obtained.

When the micromirror 31 is restored from the free oscillation state to the initial state, where the micromirror 31 is held horizontal to the substrate 32, the oscillation of the micromirror 31 can be stopped by applying to the address electrode 33 a pulsed voltage of a predetermined waveform for a designated duration when the freely oscillating micromirror 31 is in suitable position. In an alternate method for restoring the micromirror 31 to the initial state, an additional electrode for stopping the oscillation of the micromirror 31 may be provided. In this configuration, suitable voltages may be applied to the two address electrodes to apply an equivalent coulomb force F. The present invention enables the micromirror 31 to be restored to the initial state by employing a single address electrode 33 and by using a pulsed voltage.

As described with reference to FIGS. 4A to 4C, incident light can be controlled to be reflected as ON and OFF light beams by controlling the voltage to the single address electrode 33. In comparison with conventional techniques, this new technique can reduce the number of address electrodes 33 necessary for controlling the micromirrors 31, and the micromirrors 31 can be independently controlled. Additionally, since one address electrode 33 is required, the number of driving circuits 37, each connected to an address electrode 33, can also be reduced to one per micromirror 31.

In an alternative to this preferred embodiment, the ON and OFF light states may be reversed in reference to the two parts of the address electrode 33. The state where the micromirror 31 is deflected to the side of the second electrode part by applying the voltage to the single electrode may be defined as the OFF light state, and the state where the micromirror 31 is deflected to the side of the first electrode may be defined as the ON light state respectively in FIGS. 4A to 4C, when the initial state is assumed to be the intermediate light state.

Figure 4D:
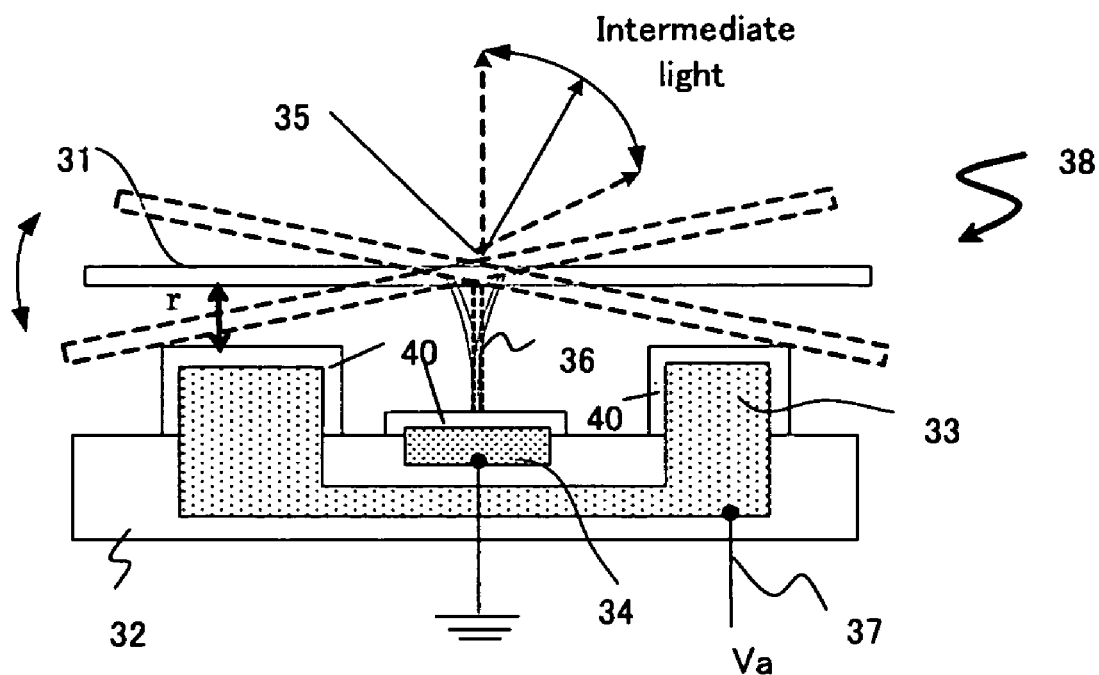
FIG. 4D is a schematic diagram that explains a method for controlling the intensity of light reflected on a projection optical path, with a total amount of reflection light by making a micromirror oscillate between the ON and the OFF light states in the mirror element shown in FIG. 4A.

FIG. 4D shows means for controlling the intensity of light reflected on the projection optical path in the intermediate light state, in which the surface of the micromirror freely oscillates between the ON, the intermediate, and the OFF light states. In the configuration shown in FIG. 4D, the total amount of light reflected on the projection optical path can be adjusted to the intensity of intermediate light between the ON and the OFF light beams by causing the micromirror to repeat its free oscillation between the ON, the intermediate, and the OFF light states. In this way, one micromirror 31 can be controlled to deflect in the ON light, the intermediate light, and the OFF light states with a single address electrode 33, and the quantity of light reflected on the projection optical path can be suitably adjusted. Accordingly, a higher gray scale can be achieved. Alternatively, the micromirror 31 can be changed to the intermediate light state or the OFF light state by applying the voltage to the address electrode 33 when the initial state is assumed to be, for example, the ON light state by changing the heights of the first and the second electrode parts of the single address electrode 33 shown in FIGS. 4A to 4D, or by adding a stopper or other similar component.

The three states of the micromirror 31 shown in FIGS. 4A to 4D, the initial state of the micromirror, the state in which the micromirror is deflected to the first electrode part, and the state in which the micromirror is deflected to the second electrode part of the single address electrode 33 may all be defined as any of the ON light state, the OFF light state, and the intermediate light states in this specification. Additionally, using the elastic hinge 36 with a restoring force suitable for the purpose can control the free oscillation.

Figure 4E:
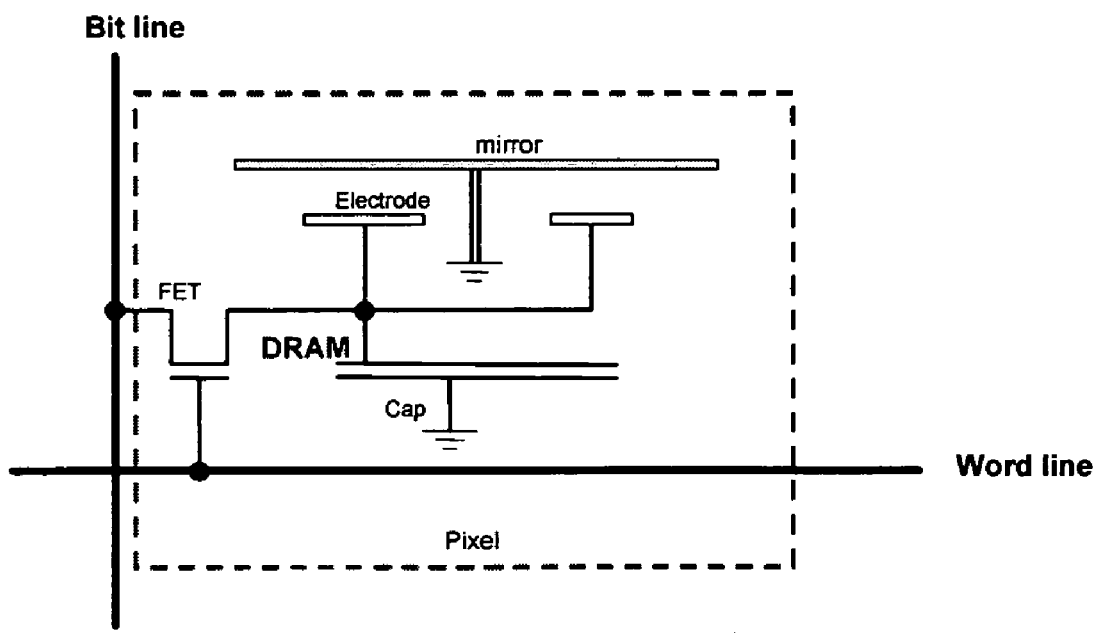
FIG. 4E is a schematic diagram that shows one driving circuit connected to a single address electrode situated in one mirror element shown in FIGS. 4A to 4D.

FIG. 4E shows the circuit configuration where the driving circuit is connected to the single address electrode in one mirror element in the micromirror device according to the present invention shown in FIGS. 4A to 4D. Since the present invention requires a single address electrode, the amount of wiring can be reduced, in comparison with that required by the conventional configuration of the two address electrodes shown in FIG. 2B.

Figure 1:
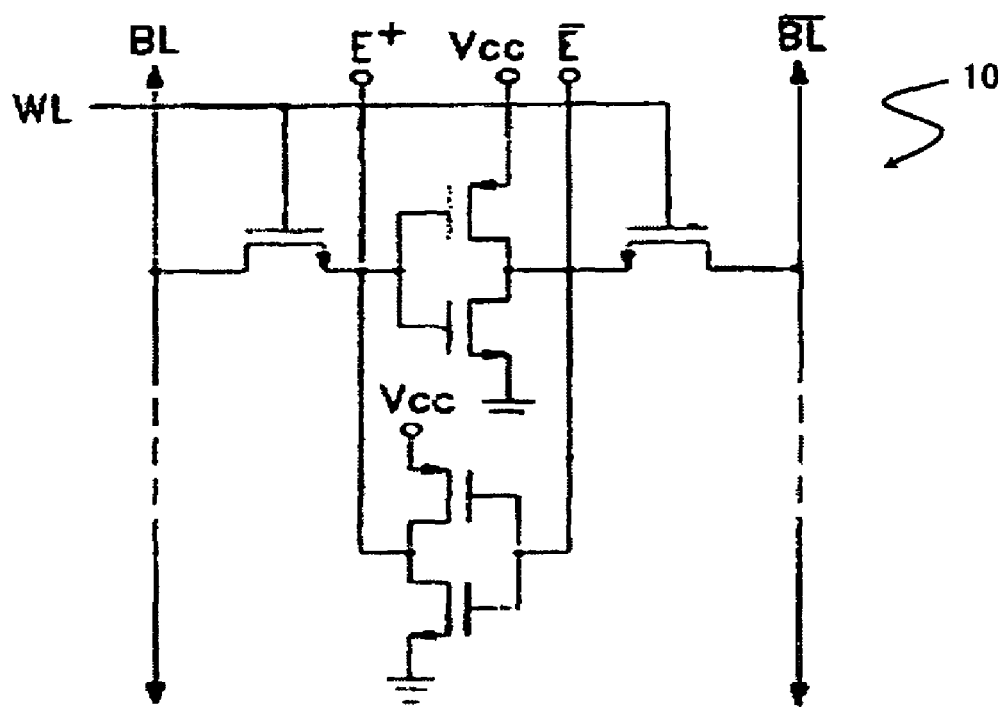
FIG. 1 is a circuit diagram that shows two driving circuits configured with memory cells with an SRAM configuration, which are connected to two address electrodes according to the conventional method.
Figure 2A:
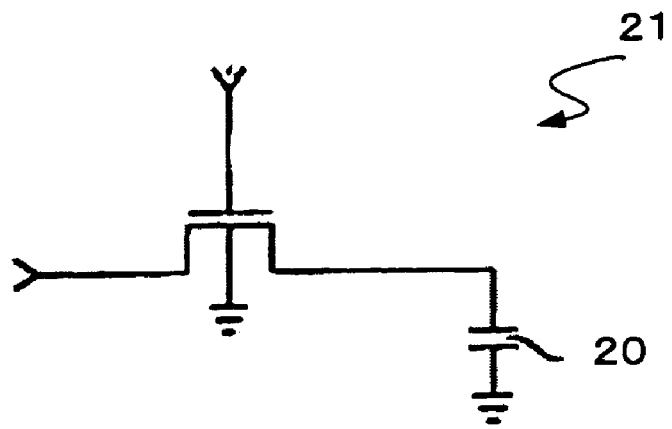
FIG. 2A is a circuit diagram that shows a driving circuit configured with a charge storage cell, which is connected to an address electrode, according to the conventional method.
Figure 2B:
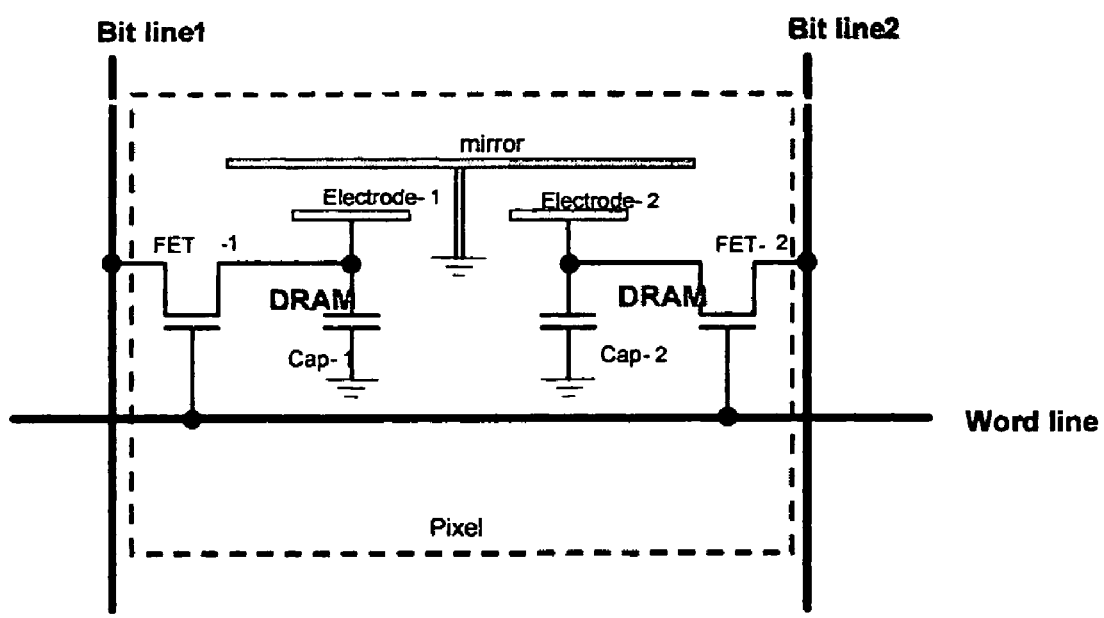
FIG. 2B is a schematic diagram that shows two driving circuits connected to two address electrodes provided in one mirror element.

As described above, in FIGS. 4A to 4D, incident light can be controlled to be reflected as the ON, the intermediate, and the OFF light beams by controlling the micromirror 31 with the single address electrode 33 in one mirror element 38 in the micromirror device according to the present invention. Therefore, the number of address electrodes 33 can be reduced from two to only one. Unlike the conventional techniques of applying two address electrodes for controlling the deflection angle of the micromirror. Instead, the number of driving circuits 37 connected to the address electrodes 33 can be reduced. As a result, the circuit configuration of the mirror element 38 can also be reduced to half of the conventional configuration (two circuits). Accordingly, the area occupied by the driving circuits 37 on the substrate 32 can be reduced. As a result, the area occupied by the driving circuits 37 on the substrate 32 becomes smaller, or a larger number of mirror elements can be arranged on the substrate 32 of the same size as a conventional one. When the same number of micromirror devices as that of a conventional device is arranged on a substrate, the substrate can be downsized, leading to reductions in the size of the micromirror device itself. As a matter of course, two completely separated electrodes may still be provided, and one memory provided for the driving circuit may apply voltages to the two electrodes, for example, as shown in FIG. 2B.

Furthermore, one large capacitor can be arranged below the micromirror, and the area of the capacitor plate determines the amount of the applied voltage. Alternatively, two separated capacitors may be arranged. As a result, the voltage applied to the electrode can be further increased, thus eliminating the influence of the voltage drop of the capacitor. Also, the influence of the photoelectric effect exerted by illumination light can be reduced.

Accordingly, the micromirror device according to the present invention is applicable to exemplary embodiment for a future super hi-vision with a high-definition resolution, a face-mounted display, an electric viewfinder, etc., and can reduce the sizes of the display device with 4K2K and 8K4K resolutions. Furthermore, according to the present invention, the configuration of the driving circuit can be made simpler than the conventional complicated configuration of two driving circuits, enabling the production of the micromirror device at lower cost.

The following descriptions are for the second to fourth preferred embodiments according to the present invention to disclose micromirror devices configured by arranging on a substrate multiple mirror elements each comprising one micromirror that is deflectable in multiple directions and supported by one elastic hinge, a single address electrode that corresponds to each micromirror and has shapes or properties asymmetrical with respect to the deflection axis of the micromirror, and one driving circuit that is connected to the address electrode and intended to control the micromirror to deflect in at least two directions.

Second Preferred Embodiment

According to the second preferred embodiment, the ON or the OFF light state can be implemented by tilting the micromirror with mutually different coulomb forces generated respectively between the micromirror and the first electrode part, and between the micromirror and the second electrode part by applying a voltage to the single address electrode based on the assumption that the initial state is the intermediate light state.

The second preferred embodiment of the present invention discloses the micromirror device including a plurality of mirror elements with each micromirror controlled to deflect to the ON and the OFF light states by forming an address electrode as one component of one mirror element, and by making the areas of the right and the left regions of the single address electrode asymmetrical with respect to the deflection axis of the micromirror.

FIGS. 5A to 5D show a method for controlling the micromirror 31 to deflect to the ON and the OFF light states by making the sizes of the first and the second electrode parts of the single address electrode 33 with different sizes in one mirror element 38 in the micromirror device according to one preferred embodiment of the present invention. The configurations and the controlling methods shown in FIGS. 5A to 5D and 6A to 6E are described based on the assumption that the mirror element 38 is configured symmetrically with respect to the elastic hinge 36 or the deflection axis of the micromirror 31 except that the area sizes of the first and the second electrode parts of the single address electrode 33 are different and asymmetrical.

A method for controlling the micromirror 31 to deflect to the ON or the OFF light state when the area sizes of the first and the second electrode parts differ in the single address electrode 33 as shown in FIGS. 5A to 5D in one mirror element 38 in the micromirror device according to the present invention is described with reference to FIGS. 6A to 6E.

Figure 5A:
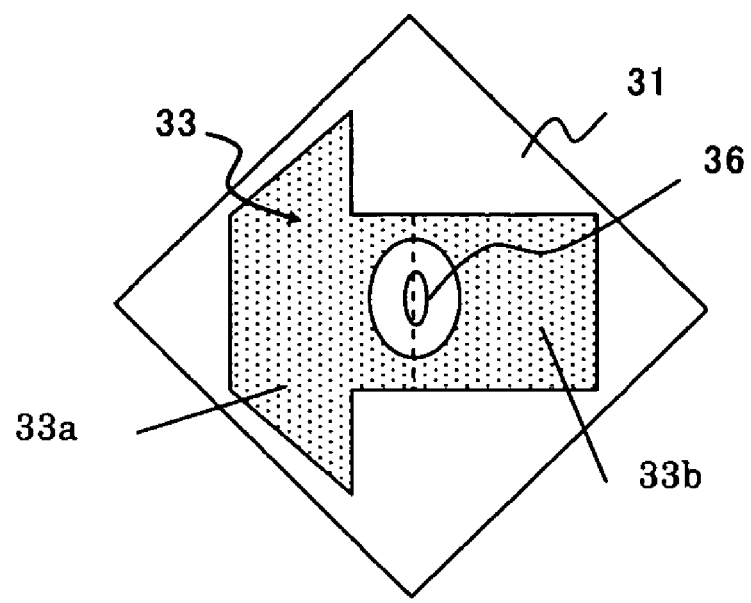
FIG. 5A is a schematic diagram that shows the correspondence between the areas of a micromirror and an address electrode (beneath the mirror) when a mirror element is viewed in the direction Z of FIG. 3, in the case where the area sizes of first and second electrode parts differ in the single address electrode of one mirror element in a micromirror device, according to a preferred embodiment of the present invention.

FIG. 5A, viewed in the direction Z of FIG. 3, shows the correspondence between the areas of the micromirror 31 and the address electrode 33 when the mirror element 38 is configured by making the areas and the shapes of the first and the second electrode parts of the single address electrode 33 different in order to vary the positions in which coulomb forces F is applied between the micromirror and the electrode parts of the address electrode.

Figure 5B:
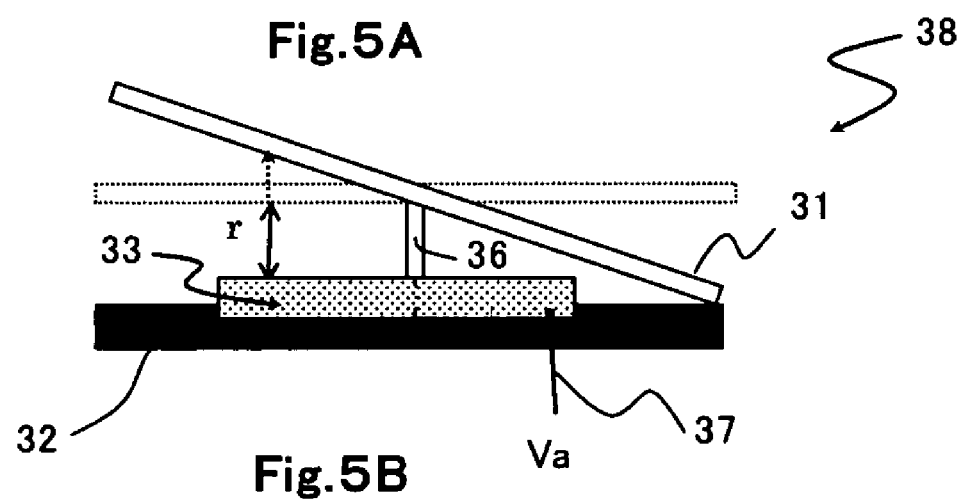
FIG. 5B is a cross-sectional view of the mirror element shown in FIG. 5A and taken along the line IV-IV of FIG. 3.

FIG. 5B is a cross-sectional view of the mirror element 38 taken along the line IV-IV of FIG. 3 in the micromirror device shown in FIG. 5A. FIG. 5A shows the configuration where the single address electrode 33 is arranged below the micromirror 31 and the area sizes of the first electrode part 33a and the second electrode part 33b of the address electrode 33 differ and are formed as one piece across the elastic hinge 36 or the deflection axis in one mirror element 38. In FIG. 5A, the area of the first electrode part 33a on the left side of the elastic hinge 36 is larger than that of the second electrode part 33b of the address electrode 33 on the right side of the elastic hinge 36. FIG. 5B is a cross-sectional view of the configuration of the mirror element taken along the line IV-IV of FIG. 3 in the micromirror device shown in FIG. 5A. This figure shows the configuration where the single address electrode 33 is arranged as one piece below one micromirror 31 on the substrate 32.

Figure 5C:
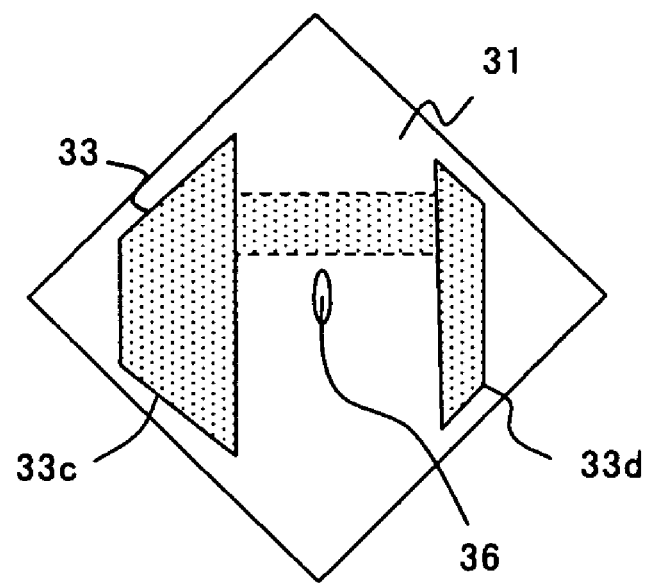
FIG. 5C is a schematic diagram that shows the correspondence between the areas of a micromirror and an address electrode (beneath the mirror) when a mirror element is viewed in the direction Z of FIG. 3, in the case where the area sizes of first and second electrode parts differ in the single address electrode of a mirror element, as an alternate embodiment of the present invention.
Figure 5D:
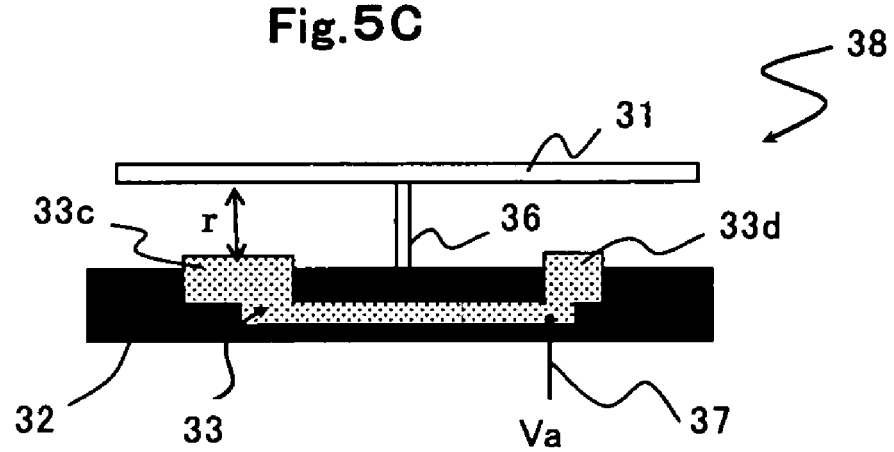
FIG. 5D is a cross-sectional view of the mirror element shown in FIG. 5C and taken along the line IV-IV of FIG. 3.

FIG. 5C, viewed in the Z direction of FIG. 3, shows the correspondence between the areas of the micromirror and the address electrode when the mirror element 38 configured with different area sizes of the first and the second electrode parts of the address electrode as an alternate embodiment of FIG. 5A. FIG. 5D is the cross-sectional view of the mirror element 38 taken along the line IV-IV of FIG. 3 in the micromirror device shown in FIG. 5C.

This figure shows a single address electrode 33 linked within the substrate 32 arranged below the micromirror 31 so that the area sizes of the first and the second electrode parts 33c and 33d of the address electrode 33, which protrude from the substrate 32, are different. Except for the difference between the area sizes, the configuration of the mirror element in this figure is the same as that of the mirror element shown in FIG. 5A. In the configuration shown in FIG. 5C, the area 33c of the first electrode part of the address electrode is larger than the area 33d of the second electrode part of the address electrode.

FIG. 5D is a cross-sectional view of the mirror element 38 shown in FIG. 5C and taken along the line IV-IV of FIG. 3. This figure shows the configuration where the two parts of the single address electrode 33 arranged below the micromirror protrude from the substrate 32 as the first and the second electrode parts 33c and 33d. The two parts of the single address electrode 33, 33c and 33d, are linked as one piece within the substrate 32 and their area sizes differ. In this case, the address electrode 33 may be transformed into another shape, such as the shape of a donut, in order to make the area sizes of the first and the second electrode parts of the address electrode 33 different.

A method for controlling the single micromirror 31 in one mirror element 38 in the micromirror device to deflect to the ON and the OFF light states when the area sizes of the first and the second electrode parts of the address electrode 33 differ according to the present invention is described. This specification assumes that the initial state where the micromirror 31 is horizontal to the substrate 32 is the intermediate light state, and that the larger electrode part of the address electrode, namely, the first electrode part 33a or 33c shown in FIG. 5A or 5C, is the deflection direction of the mirror for reflecting the OFF light, and that the smaller electrode part, namely, the second electrode part 33b or 33d shown in FIG. 5A or 5C, is defined as the deflection direction of the mirror for reflecting the ON light. A method for controlling the micromirror 31 to change from the initial state to the OFF light state, and further to the free oscillation state is described with reference to FIG. 6A showing a chart that represents the position of the micromirror 31, and a chart that represents the voltage of the address electrode 33 during the same time period.

In FIGS. 6A to 6E, the vertical axis of the chart that represents the position of the micromirror 31 indicates a move to the side of the ON light state or the OFF light state with respect to the intermediate light state as the initial state. The vertical axis of the chart that represents the voltage of the address electrode 33 indicates the state where the voltage is applied as the ON light state with respect to the initial state of 0V, that is, the state where the voltage is not applied. The horizontal axes of both of the charts indicate a time axis t that represents the same time period.

Figure 6A:
FIG. 6A is a chart that exemplifies a method for controlling the micromirror to operate in a free oscillation state, where the micromirror moves between ON and OFF light states, in the case where the area sizes of the first and the second electrode parts differ in the single address electrode of a mirror element in the micromirror device, according to the present invention.

In FIG. 6A, the position of the micromirror 31 is held in the initial state, that is, the intermediate light state up to a time $t_1$, and the voltage is not applied to the address electrode 33 during this time period. When the micromirror 31 is deflected from the initial state to the OFF light state, the micromirror 31 is tilted toward the first electrode part 33a (of FIG. 5A) or 33c (of FIG. 5C) of the address electrode 33 by applying the voltage to the address electrode 33 as indicated by the time $t_1$ to a time $t_2$. As a result, the micromirror 31 can be controlled to deflect to the OFF light state. This can be understood according to the principle that the coulomb force F represented by the following equations (1) and (2) is more intensified and applied between the first electrode part 33a or 33c with the larger area of the address electrode 33 and the micromirror 31, since the electrode part 33a or 33c with the larger area can store a larger amount of charge, than the electrode part 33b (of FIG. 5A) or 33d (of FIG. 5D) with the smaller area when the distance r between the micromirror 31 and the first electrode part 33a or 33c on the OFF light side of the address electrode 33 is the same as that between the micromirror 31 and the second electrode part 33b or 33d on the ON light side of the address electrode 33 in the initial state.

$$F = \frac{1}{4\pi r^2} \cdot \frac{1}{\varepsilon} q_1 q_2 \quad (1)$$

Where r is the distance between the address electrode 33 and the micromirror 31, ∈ is permittivity, and $q_1$ and $q_2$ are the amounts of charge stored.

The Coulomb force F can be also represented by the following equation (2).

$$F = k'eSV^2/2h^2 \quad (2)$$

where S is the area size of the address electrode 33a(33c) or 33b(33d), h is the distance between the mirror 31 and address electrode 33a(33c) or 33b(33d), e is the permittivity between the mirror 31 and address electrode 33a(33c) or 33b(33d), V is the voltage applied to the address electrode 33a(33c) or 33b(33d), and k' is a correction coefficient.

When the voltage of the address electrode 33 is reduced to 0V in the OFF light state of the micromirror 31, namely, when the application of the voltage is stopped, the coulomb force for deflecting the micromirror 31 to the OFF light state is lost, and the micromirror 31 enters the free oscillation state where the micromirror 31 deflects to the opposite side for deflecting the micromirror 31 to the ON light state with the elasticity of the elastic hinge 36 after passing through the position horizontal to the substrate in the initial state, and the micromirror 31 is restored to the OFF light state. This free oscillation state continues while its amplitude is being gradually reduced with attenuation caused by air resistance and a conversion into thermal energy by the elastic hinge. In a short time of 1/30 sec or shorter that is the standard period for one frame display on a display device, this attenuation can be set to a level that can reduce its influence.

The series of operations for causing the micromirror 31 to freely oscillate by tilting the micromirror 31 in the initial state, namely, the operations for causing the micromirror 31 to freely oscillate after tilting the micromirror 31 from the state horizontal to the substrate 32 is hereinafter referred to as "initial operations" in this specification.

Figure 6B:
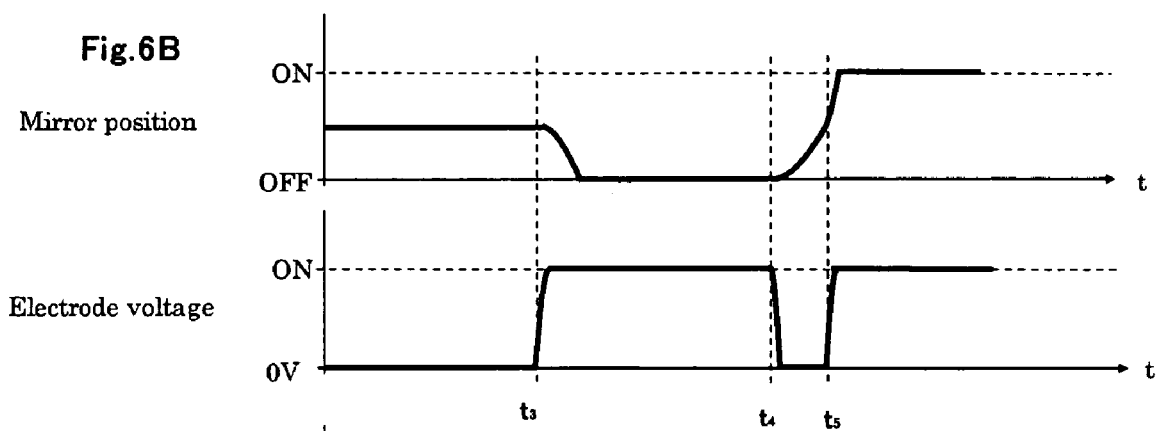
FIG. 6B is a chart that exemplifies a method for controlling the micromirror to change from an intermediate light state, that is, the initial state, to the OFF light state, and further to the ON light state, in the case where the area sizes of the first and the second electrode parts differ in the single address electrode of a mirror element in the micromirror device, according to the present invention.

A method for controlling the micromirror 31 to change from the initial state to the OFF light state, and further to the ON light state is described next with reference to FIG. 6B showing a chart that represents the position of the micromirror 31 along with a chart that represents the voltage of the address electrode 33 during the same time period, as indicated by the time axis t.

Similar to FIG. 6A, the position of the micromirror 31 is controlled to be held in the initial state that is the intermediate light state up to a time $t_3$ also in FIG. 6B, and the voltage is not applied to the address electrode 33 in this time period.

When the micromirror 31 is deflected from the initial state to the OFF light state, the micromirror 31 is tilted toward the first electrode part 33a or 33c of the address electrode 33 by applying the voltage to the address electrode 33 as indicated by the duration of time $t_3$ to a time $t_4$. As a result, the micromirror 31 can be deflected to the OFF light state.

A controlling method for deflecting the micromirror 31 from the OFF light state to the ON light state is described next. The micromirror 31 that is deflected from the initial state to the OFF light state enters the free oscillation state by temporarily reducing the voltage of the address electrode 33 to 0V for the duration of time $t_4$ to time $t_5$. The operations described up to this point are the initial operations described with reference to FIG. 6A. By the timely application of the voltage to the second electrode part 33b or 33d with the smaller area on the ON light side of the address electrode at the time $t_5$ when the micromirror 31 becomes close to the second electrode part 33b or 33d, the micromirror 31 can be held on the ON light side. As a result, the micromirror 31 can be held in the ON light state.

This is implemented as follows: the coulomb force F represented by the equation (1) is more intensified by the square of the distance r than by the amounts of charge $q_1$ and $q_2$, and a higher coulomb force F is applied to the side of the shorter distance r between the address electrode 33 and the micromirror 31 by suitably adjusting both the area sizes of the ON and the OFF light sides of the single address electrode 33 even when the area size of the second electrode part of the address electrode is smaller than that of the first electrode part, whereby the micromirror 31 can be deflected to the ON light side. In this way, the micromirror 31 can be controlled to change from the initial state to the OFF light state, and further to the ON light state.

Figure 6C:
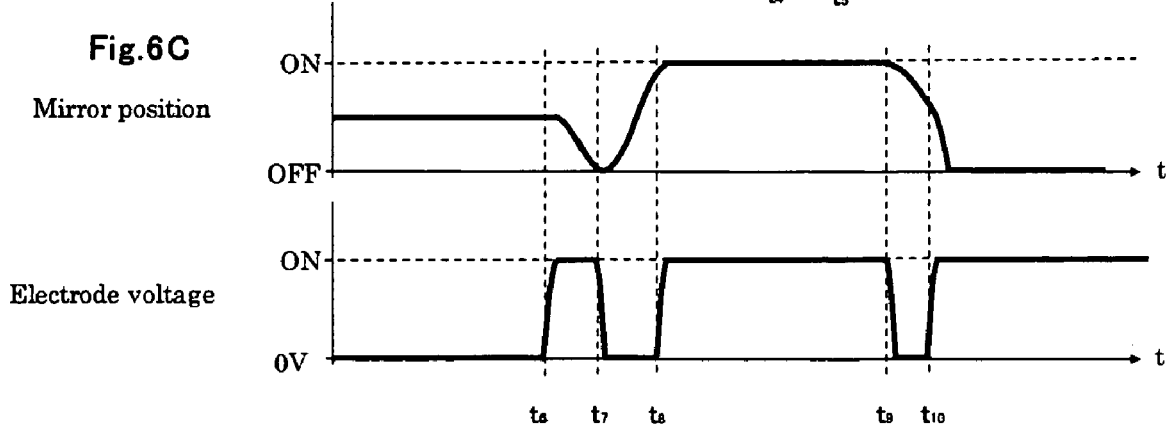
FIG. 6C is a chart that exemplifies a method for controlling the micromirror to change from the intermediate light state, that is, the initial state, to the ON light state, and further to the OFF light state, in the case where the area sizes of the first and the second electrode parts differ in the single address electrode of a mirror element in the micromirror device, according to the present invention.

A method for controlling the micromirror 31 to change from the initial state to the ON light state, and further to the OFF light state is described next with reference to FIG. 6C showing the chart that represents the position of the micromirror 31 along with the chart that represents the voltage of the address electrode 33 during the same time period, as indicated by the time axis t.

In FIG. 6C, the micromirror 31 is held in the initial state that is the intermediate light state up to a time $t_6$, and a voltage is not applied. When the micromirror 31 is deflected from the initial state to the ON light state, the micromirror 31 is tilted toward the first electrode part 33a or 33c with the larger area of the address electrode 33 by temporarily applying the voltage to the address electrode 33 as indicated by the time $t_6$ to a time $t_7$. As a result, the micromirror 31 enters the OFF light state. This operation is required to cause the micromirror 31 to freely oscillate by tilting the micromirror 31 from one side to another. Alternatively, the mirror can be deflected in the reverse direction by reducing the voltage applied to the address electrode 33 to a lower level or to 0V when the required elastic spring force remains even if the micromirror is not completely deflected to the OFF light state, or before the micromirror 31 is deflected to the OFF light state. The micromirror tilted from the initial state to the OFF light state enters the free oscillation state by temporarily reducing the voltage of the address electrode 33 to 0V from the time $t_7$ to a time $t_8$. By timely applying the voltage to the second electrode part 33b or 33d with the smaller area on the ON light side of the address electrode 33 at the time $t_8$ when the micromirror 31 becomes close to the second electrode part 33b or 33d on the ON light side during the free oscillation, the micromirror 31 can be held on the ON light side. As a result, the micromirror 31 can be deflected to the ON light state. Specifically, the Coulomb force F is applied when the micromirror 31 is changed from the OFF light state to the ON light state in FIG. 6B. Inversely, when the micromirror is controlled to deflect from the ON light state to the OFF light state, the micromirror 31 reenters the free oscillation state by reducing to 0V the voltage of the address electrode 33 of the micromirror 31 held in the ON light state as indicated by a time $t_9$ to a time $t_{10}$.

The micromirror 31 is controlled and held in the OFF light state by applying the voltage to the address electrode 33 when the micromirror 31 becomes close to the side of the second electrode part 33b or 33d inversely to the case where the micromirror is changed to the ON light state. Because the distance r between the address electrode 33 and the micromirror 31 predominantly functions over the area size of the first or the second electrode part of the address electrode 33 in the equation (1) as in the description of the coulomb force F applied when the micromirror 31 is deflected from the OFF light state to the ON light state as shown in FIG. 6B. In this way, the micromirror 31 can be controlled to change from the initial state to the ON light state, and further to the OFF light state.

A method for controlling the micromirror 31 to change from the OFF light state of the micromirror 31 to the initial state is described next with reference to FIG. 6D showing the chart that represents the position of the micromirror 31 along with the chart that represents the voltage of the address electrode 33 during the same time period, as indicated by the time axis t.

Assume that the micromirror 31 is held in the OFF light state up to a time $t_{11}$ by applying the voltage to the address electrode 33 in FIG. 6D. When the micromirror 31 is restored from the OFF light state to the initial state, a suitable pulsed voltage is applied as indicated by the time $t_{11}$ to a time $t_{13}$. In this case, the micromirror 31 enters the free oscillation state by reducing the voltage of the address electrode 33 to 0V at the time $t_{11}$ in the OFF light state of the micromirror 31, and the micromirror 31 can be restored to the initial state by generating a coulomb force F that draws the micromirror 31 to the OFF light side, namely, by generating the force reverse to the moving direction of the micromirror 31 by temporarily applying the suitable voltage to the address electrode 33 in a suitable distance r between the address electrode 33 and the micromirror 31 while the micromirror 31 is moving from the OFF light state to the ON light state. Accordingly, the micromirror 31 can be restored to the initial state by applying the pulsed voltage to the single address electrode 33. If the micromirror 31 cannot be completely restored to the initial state by applying the pulsed voltage only once, such a control may be repeated multiple times.

As described above, the micromirror 31 can be controlled to restore from the OFF light state to the initial state.

A method for restoring the micromirror 31 from the ON light state to the initial state (the inverse of FIG. 6D) is described with reference to FIG. 6E showing the chart that represents the position of the micromirror 31 along with the chart that represents the voltage of the address electrode 33 during the same time period, as indicated by the time axis t.

In FIG. 6E, the micromirror 31 is controlled and held in the ON light state up to a time $t_{14}$ by applying the voltage to the address electrode 33. When the micromirror 31 is restored from the ON light state to the initial state, a suitable pulsed voltage is applied as indicated by the time $t_{14}$ to a time $t_{16}$. This is implemented as follows: the micromirror starts to freely oscillate by reducing the voltage of the address electrode 33 to 0V at time $t_{14}$ in the OFF light state of the micromirror 31, and an acceleration reverse to the moving direction of the micromirror 31 is generated by causing the coulomb force F to draw the micromirror 31 back to the ON light side by temporarily applying a suitable voltage to the address electrode at a time $t_{15}$ when the distance r between the address electrode 33 and the micromirror 31 reaches a suitable point while the freely oscillating micromirror is moving from the ON light side to the OFF light side, whereby the micromirror can be restored to the initial state quickly or within a predetermined time. This is because the distance r between the address electrode 33 and the micromirror 31 predominantly functions over the area size of the first or the second electrode part of the address electrode 33 in the equation (1) in a similar manner as in FIG. 6B. Accordingly, the micromirror 31 can be restored to the initial state by applying the pulsed voltage to the single address electrode 33. In this way, the micromirror 31 can be restored from the ON light state to the initial state.

FIGS. 6D and 6E show the nearly linear changes of the micromirror 31 from the deflection state to the horizontal initial state. However, the locus of the change of the micromirror 31 may be a locus representing that the micromirror 31 changes toward the initial state after being again deflected in the same direction.

The micromirror 31 can therefore be stopped in a shorter time than that required for restoring the micromirror to the initial state by being naturally attenuated after the micromirror 31 starts to freely oscillate. The techniques of the present invention is not limited to the loci of the micromirror 31 and the waveforms of the applied voltage shown in FIGS. 6D and 6E.

As described for FIGS. 6A to 6E, the micromirror 31 can be controlled to change to the OFF light state after the initial operations by applying the voltage to the address electrode 33 when the micromirror 31 becomes close to the electrode part on the OFF light side. In contrast, the micromirror 31 can be controlled to change to the ON light state by applying the voltage to the address electrode 33 when the micromirror 31 becomes close to the electrode part on the ON light side. Furthermore, the micromirror 31 can be restored from the free oscillation state to the initial state by applying the pulsed voltage to the address electrode 33.

The configurations and the controlling methods according to the present invention shown in FIGS. 5A to 5D and 6A to 6E are characterized in that the area sizes of the first and the second electrode parts of the single address electrode 33 are made different and asymmetrical in order to implement the initial operations for causing the micromirror 31 to freely oscillate. Furthermore, the micromirror 31 can be controlled to change to the ON and the OFF light states by applying the voltage when the freely oscillating micromirror 31 becomes close to the ON or the OFF light side that is the first or the second electrode part of the address electrode 33.

The initial state, the deflection state for deflecting the micromirror 31 of the first electrode part 33a or 33c with the larger area of the address electrode, and the deflection state for deflecting the micromirror 31 to the second electrode part 33b or 33d with the smaller area of the address electrode may be made to correspond to any of the ON, the OFF, and the intermediate light states as needed. However, it is preferable to make the OFF and the ON light states correspond to the deflection state for deflecting the micromirror 31 to the electrode part with the larger area. Also, it preferable to control the deflection state for deflecting the micromirror 31 to the electrode part with the smaller area respectively as in this preferred embodiment. This is because the micromirror 31 must be once deflected to the ON light state as the initial operations for causing the micromirror 31 to freely oscillate if the ON light state is made to correspond to the deflection state for deflecting the micromirror 31 to the electrode part with the larger area of the single address electrode, and light that is not originally related to image projection is projected due to the incidence of light to the projection optical path at this time. This is not preferable for image projection.

Third Preferred Embodiment

The third preferred embodiment discloses the micromirror device that includes a plurality of mirror elements in each of which the micromirror can be controlled to deflect to the ON and the OFF light states by making the right and the left regions of the address electrode with different heights. The address electrode is formed as one piece and arranged across the elastic hinge or the deflection axis of the micromirror.

FIGS. 7A to 7D show a method for controlling the micromirror 31 to deflect to the ON or the OFF light state with the first and the second electrode parts of the single address electrode 33 have different heights in one mirror element 38 in the micromirror device according to the present invention. The mirror element 38 shown in FIGS. 7A to 7D is described for a configuration that the first and the second electrode parts of the address electrode 33 are symmetrically placed with respect to the elastic hinge or the deflection axis of the micromirror 31. But the first and the electrode parts have different heights.

Figures 7A, 7B:
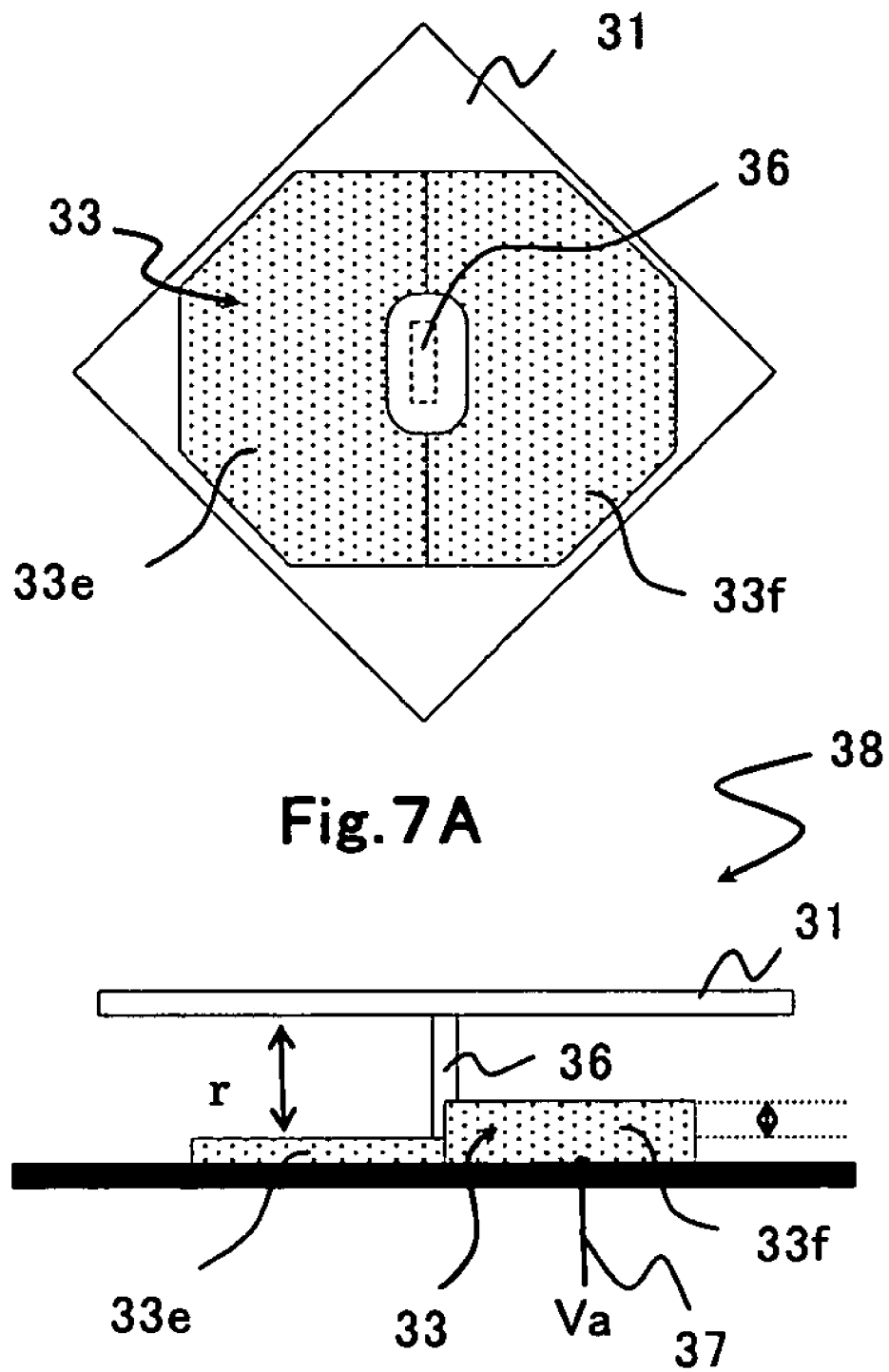
FIG. 7A is a schematic diagram of one mirror element in the micromirror device that shows the correspondence between the areas of the micromirror and the address electrode (beneath the mirror) when the mirror element is viewed in the direction Z of FIG. 3, in the case where the heights of the first and the second electrode parts differ in the single address electrode, according to one preferred embodiment of the present invention.
FIG. 7B is a cross-sectional view of the mirror element shown in FIG. 7A and taken along the line IV-IV of FIG. 3.

FIG. 7A shows the correspondence between the sizes of the areas of the micromirror and the address electrode by viewing the mirror element 38 in the direction Z of FIG. 3. The first and the second electrode parts of the single address electrode 33 have different heights in one mirror element 38 in the micromirror device according to the present invention. FIG. 7B is a cross-sectional view of the mirror element 38 shown in FIG. 7A and taken along the line IV-IV of FIG. 3.

In FIG. 7A the first electrode part 33$e$ and the second electrode part 33$f$ are arranged below the micromirror 31 with the first electrode part 33$e$ and the second electrode part 33$f$ have different heights while their area sizes are equal. The single address electrode is configured as one piece across the elastic hinge 36 or the deflection axis of the micromirror. Specifically, the second electrode part 33$f$ on the right side of the elastic hinge 36 is higher than the first electrode part 33$e$ on the left side of the elastic hinge.

Figure 7C:
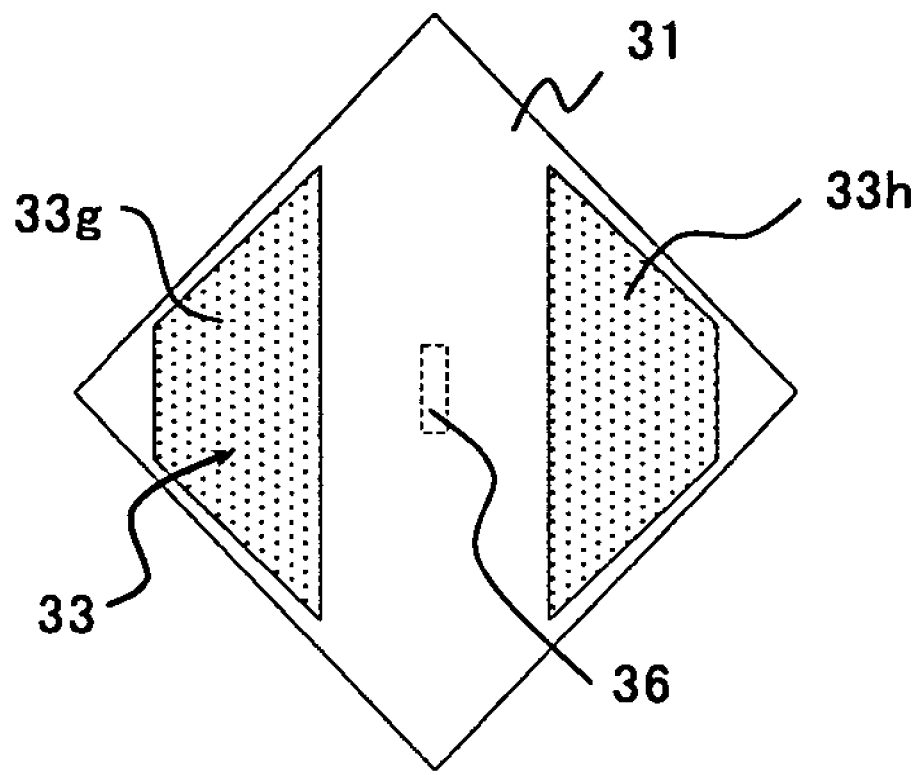
FIG. 7C is a schematic diagram of one mirror element in the micromirror device that shows the correspondence between the areas of a micromirror and an address electrode (beneath the mirror) when the mirror element is viewed in the direction Z of FIG. 3, in the case where the heights of the first and the second electrode parts differ in the single address electrode, as an alternate embodiment of FIG. 7A.
Figure 7D:
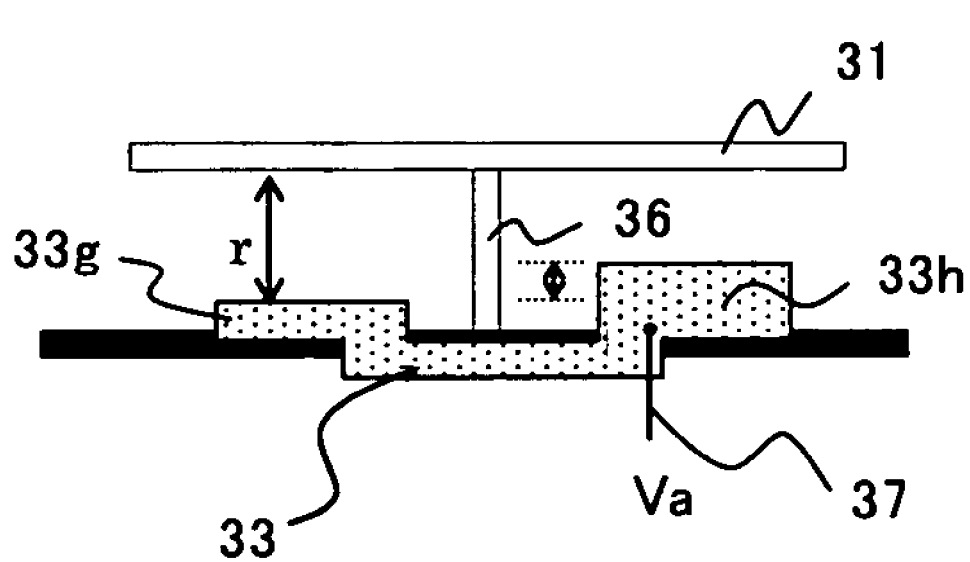
FIG. 7D is a cross-sectional view of the mirror element shown in FIG. 7C and taken along the line IV-IV of FIG. 3.

FIG. 7B is a cross-sectional view of the mirror element 38 shown in FIG. 7A and taken along the line IV-IV of FIG. 3 in the micromirror device. The single address electrode 33 positioned below the micromirror 31 is configured as one piece on the substrate 32. The first electrode part 33$e$ and the second electrode part 33$f$ have different heights. FIG. 7C shows the correspondence between the sizes of the areas of the micromirror and the address electrode by viewing the mirror element 38 in the direction Z of FIG. 3. The mirror element 38 includes the first electrode part 33$g$ and the second electrode part 33$h$ of the single address electrode have different heights as an alternate embodiment of FIG. 7A. FIG. 7D is a cross-sectional view of the mirror element 38 shown in FIG. 7C and taken along the line IV-IV of FIG. 3 in the micromirror device according to the third preferred embodiment of the present invention.

FIG. 7C shows the single address electrode linked within the substrate 32 below the micromirror 31 with the first electrode part 33$g$ and the second electrode part 33$h$ protruding from the substrate 32 have different heights. Specifically, the height of the second electrode part 33$h$ of the single address electrode is higher than that of the first electrode part 33$g$.

FIG. 7D shows the configuration where the first electrode part 33$g$ and the second electrode part 33$h$ protruding from the substrate 32 have different heights and both of the electrode parts are linked within the substrate in the single address electrode 33 positioned below the micromirror 31.

The address electrode 33 may be reconfigured to make the first and the second electrode parts of the address electrode 33 have different heights as needed. When the sizes or the positions of the right and the left regions of the address electrode are symmetrical and only their heights are different, micromirror 31 deflects to the right and the left regions with different angles. With this configuration, the deflection angles to the right and the left sides of the micromirror 31 can be made equal with a protrusion stopper in the electrode part with a lower height.

This invention thus discloses a method for controlling the micromirror 31 to deflect to the ON and the OFF light state when the ON and the OFF light sides that are the first and the second electrode parts, respectively, differ in height in the single address electrode 33 of one mirror element 38 in the micromirror device. The method for controlling the micromirror 31 to deflect to the ON and the OFF light states in this preferred embodiment can also be understood according to the controlling method described with reference to FIGS. 6A to 6E.

The method for controlling the mirror element according to the third preferred embodiment is briefly described below. By applying a voltage, the micromirror 31 is deflected from the initial state; the micromirror is tilted to the higher second electrode part 33$f$ or 33$h$ of the address electrode 33 according to the equation (1). Specifically, a higher coulomb force F is applied between the second electrode part 33$f$ with a greater height or 33$h$ of the address electrode 33 and the micromirror 33 because their distance r becomes shorter than that between the lower first electrode part 33$e$ or 33$g$ and the micromirror 31 in the initial state of the micromirror 31.

A method for controlling the micromirror 31 to deflect to the OFF or the ON light state is described next. The micromirror 31 when tilted from the initial state and enters the free oscillation state, the voltage of the address electrode 33 is temporarily reduced to 0V. By timely applying the voltage during the free oscillation when the micromirror 31 comes close to the first electrode part 33$e$ or 33$g$ or the second electrode part 33$f$ or 33$h$ that is the ON or the OFF light side, the micromirror 31 can be controlled and held on the ON or the OFF light side. As a result, the micromirror 31 is controlled and held in the ON or the OFF light state. In this case, the coulomb force F represented by the equation (1) is more intensified by the distance r between the micromirror 31 and the address electrode 33, and a higher coulomb force F is therefore applied to the side of the shorter distance r. Thus, the micromirror 31 can be deflected to the ON or the OFF light side. In this way, the micromirror is deflected from the initial state to the OFF or the ON light state.

Also a method for restoring the micromirror 31 from the OFF or the ON light state to the initial state in this preferred embodiment can also be implemented according to the controlling method described with reference to FIGS. 6A to 6E. Namely, by applying a suitable pulsed voltage in the ON or the OFF light state of the micromirror 31, the micromirror can be restored to the initial state. Specifically, by temporarily reducing the voltage of the address electrode 33 to 0V, the micromirror 31 starts to freely oscillate. An acceleration reverse to the moving direction of the micromirror 31 is generated. The coulomb force F to draws the micromirror 31 to the side opposite to the side to which the micromirror 31 is moving when the voltage to the address electrode 33 is temporarily reduced and the distance r between the address electrode 33 and the micromirror 31 reaches a suitable point in the moving direction of the freely oscillating micromirror 31. Thus the micromirror 31 is restored to the initial state. Accordingly, by applying a pulsed voltage of a predetermined duration of time to the single address electrode 33, the micromirror 31 is restored from the ON or the OFF light state to the initial state.

Figure 7E:
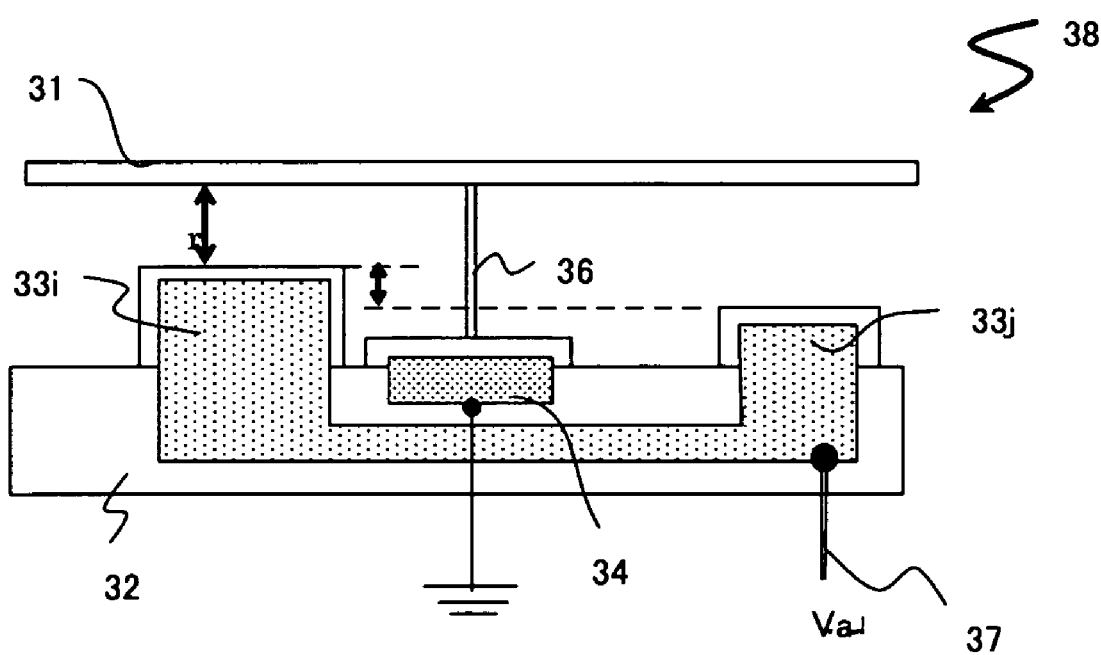
FIG. 7E is a schematic diagram of one mirror element in the micromirror device that shows a mechanism for controlling the deflection of a micromirror to the ON and the OFF light states, in the case where the heights and the area sizes of the first and the second electrode parts differ in the single address electrode, according to one preferred embodiment of the present invention.

FIG. 7E shows the configuration to control the micromirror 31 to deflect to the ON and the OFF light states when the first electrode part 33$i$ and the second electrode part 33$j$ of the single address electrode 33 across the elastic hinge 36 or the deflection axis of the micromirror have different heights and area sizes as one preferred embodiment of the mirror element in the micromirror device according to the present invention.

In FIG. 7E, the mirror element 38 is configured symmetrically with respect to the elastic hinge 36 or the deflection axis of the micromirror. But the first electrode part 33*i* and the second electrode part 33*j* of the single address electrode 33 have different heights and the areas.

FIG. 7E shows the configuration implemented by combining the configurations shown in FIGS. 5A and 5C, and 7A and 7C. This configuration is characterized in that the first electrode part 33*i* and the second electrode 33*j* of the single address electrode 33 have different area sizes and heights of the ON and the OFF light sides A person having ordinary skill in the art can easily understand the controlling method used in the configuration shown in FIG. 7E according to the controlling method described with reference to FIGS. 5A to 5D, 6A to 6E, and 7C to 7D.

Fourth Preferred Embodiment

The fourth preferred embodiment discloses the configuration to control the micromirror to deflect to the ON or the OFF light state with a coulomb force. The top surfaces of the right and the left regions of the single address electrode formed as one piece and arranged across the elastic hinge 36 or the deflection axis of the micromirror have layers with different permittivities in one mirror element in the micromirror device according to the fourth preferred embodiment of the present invention.

Figure 8A:
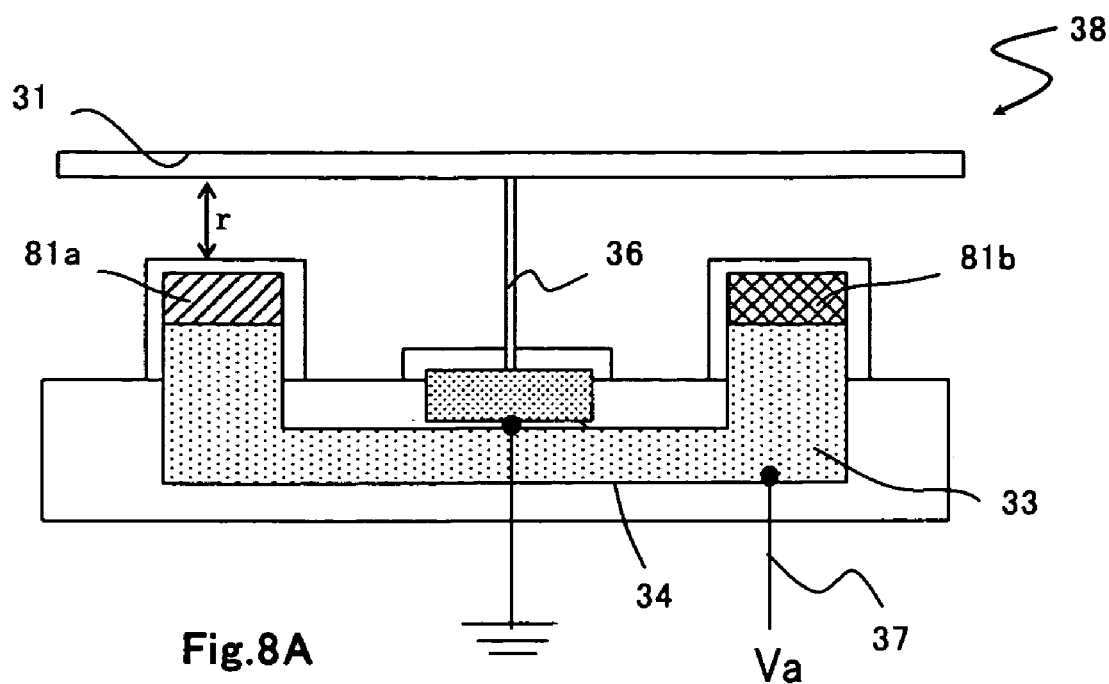
FIG. 8A is a schematic diagram of one mirror element in the micromirror device that shows the tops of the first and the second electrode parts of a single address electrode configured with materials having different permittivities, according to one preferred embodiment of the present invention.

FIG. 8A shows the configuration where the micromirror 31 is controlled to deflect to the ON or the OFF light state by forming the top surfaces of the first and the second electrode parts of the address electrode 33 in one mirror element 38 in the micromirror device as one preferred embodiment of the present invention with materials 81*a* and 81*b* have different permittivities. The mirror element 38 is configured symmetrically with respect to the elastic hinge 36. But the materials 81*a* and 81*b* on the tops of the first and the second electrode parts of the single address electrode 33 have different permittivities.

FIG. 8A shows the cross-section of the configuration where the materials 81*a* and 81*b* on the tops of the first and the second electrode parts of the single address electrode 33 positioned below the micromirror 31 in one mirror element in the micromirror device according to this preferred embodiment of the present invention have different permittivities.

The address electrode 33 may be suitably reconfigured with the materials 81*a* and 81*b* on the tops of the first and the second electrode parts of the address electrode 33 have different permittivities. For example, metals such as Si, SiC, Si3N4, Al2O3, and HfO$_2$ that is referred to as a high-k material and has been attracting attention in recent years as a material with high permittivity available to the shrinkage of a semiconductor are suitably selected and used as the materials 81*a* and 81*b*. This material with different permittivities may be selected for the right and the left regions of the address electrode 33. Alternatively, the thicknesses and the materials of films for protecting the electrodes may be varied respectively for the right and the left regions.

This invention thus discloses a method for controlling the micromirror 31 to deflect to the ON and the OFF light states by forming the tops of the first and the second electrode parts of the single address electrode 33 with the materials 81*a* and 81*b* have different permittivities in one mirror element 38 in the micromirror device. Specifically, the method to control the micromirror 31 in this preferred embodiment is described with reference to FIGS. 6A to 6E. The method for controlling the micromirror in the mirror element in the fourth preferred embodiment is briefly described below.

When the micromirror 31 is deflected from the initial state, the micromirror is tilted to the side of the address electrode 33 configured with a material with low permittivity, according to the equation (1) by applying a voltage to the address electrode 33. Because the permittivity $\in$ of the side of the address electrode 33 is configured with the material of low permittivity than that of the side of the address electrode 33 configured with the material with high permittivity. A higher coulomb force F is therefore applied to the side of the address electrode 33 configured with the material with low permittivity.

By temporarily reducing the voltage of the address electrode 33 to 0V, the micromirror 31 is tilted from the initial state and starts to freely oscillate. When the freely oscillating micromirror 31 becomes close to the ON or the OFF light side of the address electrode, by timely applying a suitable voltage to the address electrode 33, the micromirror 31 can be held on the ON or the OFF light side that is the first or the second electrode part. As a result, the micromirror 31 is controlled to deflect to the ON or the OFF light state. Because the Coulomb force F represented by the equation (1) is more intensified by the square of the distance r between the micromirror 31 and the address electrode 33 than by the permittivity $\in$ of the address electrode 33. A higher coulomb force F is therefore applied to the side of the shorter distance r between the address electrode 33 and the micromirror 31, whereby the micromirror 31 is tilted to the ON or the OFF light side of the address electrode 33 with the shorter distance r from the micromirror 31. Therefore, the micromirror 31 is controlled to change from the initial state to the OFF or the ON light state.

According to the controlling method described with reference to FIGS. 6A to 6E, a method for controlling the micromirror 31 to restore from the OFF or the ON light state to the initial state is described. Namely, by applying a suitable voltage in the ON or the OFF light state of the micromirror 31, the micromirror 31 can be restored from the ON or the OFF light state to the initial state.

Specifically, by temporarily reducing to 0V the voltage of the electrode part of the address electrode 33 holding the micromirror 31 when the micromirror 31 starts to freely oscillate, an acceleration reverse to the moving direction of the micromirror 31 is generated thus causing the coulomb force F to draw the micromirror 31 back to the side opposite to the side. By temporarily applying the voltage to the address electrode 33 when the distance r between the address electrode 33 and the micromirror 31 reaches a suitable point, the freely oscillating micromirror 31 is moving from the side that holds the micromirror 31 toward the opposite side, whereby the micromirror 31 can be restored to the initial state. In this way, the micromirror 31 can be restored from the ON or the OFF light state to the initial state by applying the pulsed voltage to the single address electrode 33.

Figure 8B:
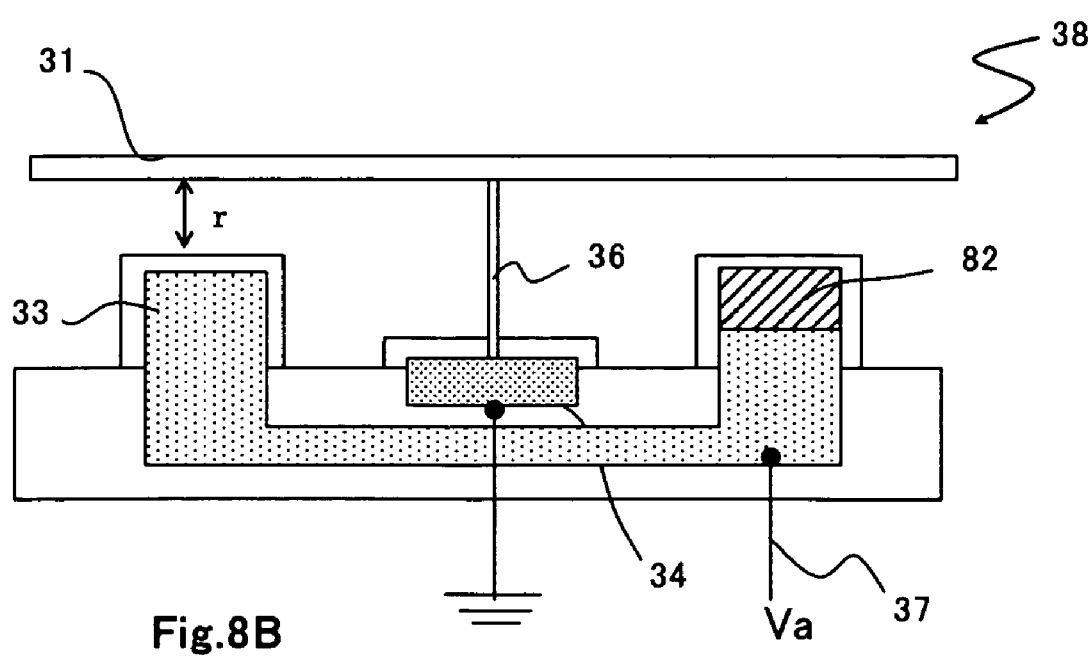
FIG. 8B is a schematic diagram of one mirror element in the micromirror device that shows the arrangement of the single address electrode where either of the tops of the first or the second electrode parts of the address electrode is configured with a material having a different permittivity than that of the rest of the electrode, according to one preferred embodiment of the present invention.

FIG. 8B shows a mirror configuration to control the micromirror 31 to deflect to the ON or the OFF light state. A material 82 with a permittivity different from that of the address electrode 33 at the top of one of the electrode parts of the single address electrode 33 in one mirror element 38 in the micromirror device.

FIG. 8B depicts the mirror element 38 configured symmetrically with respect to the elastic hinge 36 or to the deflection axis of the micromirror, While the top surfaces of the address electrode 33 on either of the tops of the ON and the OFF light sides of the single address electrode 33 are formed with different dielectric materials in the mirror element 38 in the micromirror device as one preferred embodiment of the present invention.

The configuration shown in FIG. 8B is characterized in that either of the tops of the electrode parts of the single address electrode 33 is formed with material 82 that has a permittivity different from that of the address electrode 33 as an alternate embodiment of the configuration of one mirror element 38 in the micromirror device according to the present invention shown in FIG. 8A.

According to the controlling method described with reference to FIG. 8A, a person having ordinary skill in the art can easily understand a method for controlling the micromirror 31 to deflect to the ON or the OFF light state with the single address electrode 33 in the mirror element 38 in the micromirror device shown in FIG. 8B.

The fifth to seventh preferred embodiments of the present invention disclose the micromirror devices supported on a substrate. The substrate includes a plurality of mirror elements each comprising at least one elastic hinge that can deflect a micromirror in a plurality of directions. One micromirror has shapes or properties asymmetrical with respect to the deflection axis. The mirror further includes a single address electrode and one driving circuit connected to the address electrode to control the micromirror to deflect in at least two directions.

Fifth Preferred Embodiment

The fifth preferred embodiment discloses the micromirror device where the micromirror is controlled to deflect to the ON and the OFF light states with a coulomb force. The regions of the micromirror respectively face and correspond to the first and the second electrode parts of the single address electrode across the elastic hinge or the deflection axis of the micromirror are formed with materials with different permittivities.

Figure 9:
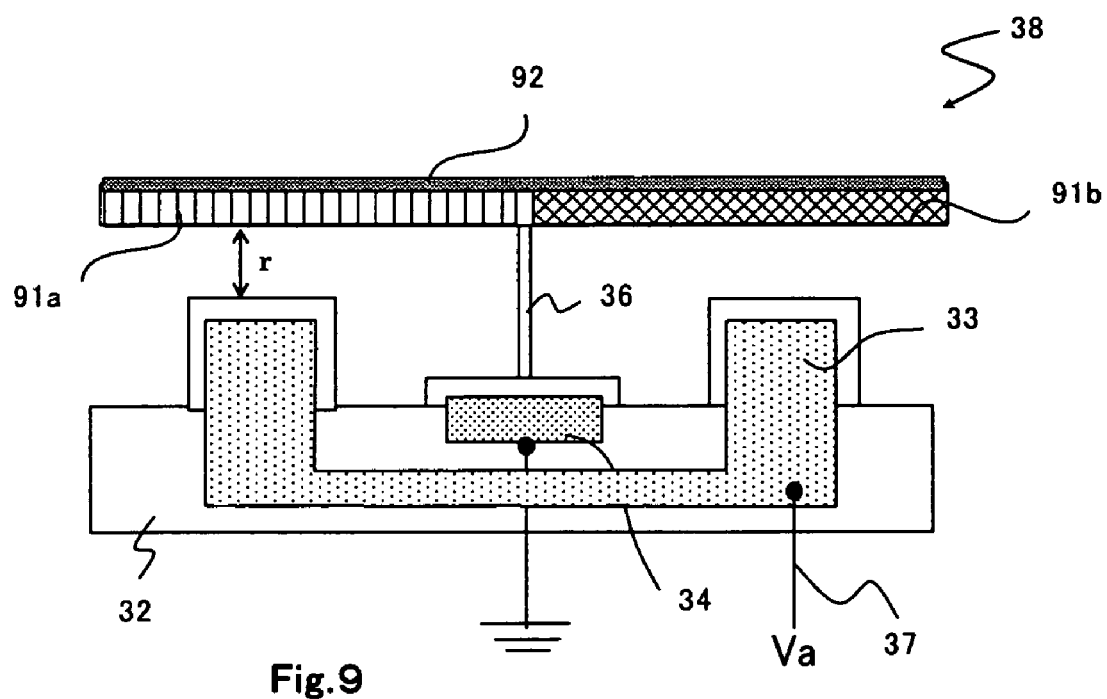
FIG. 9 is a schematic diagram of one mirror element in the micromirror device that shows the configuration where two regions of the micromirror, which respectively face and correspond to the first and the second electrode parts of the single address electrode, are configured with materials having different permittivities, according to one preferred embodiment of the present invention.

FIG. 9 depicts the mirror element 38 configured symmetrically with respect to the elastic hinge 36 while the regions respectively face and correspond to the first and the second electrode parts of the single address electrode 33 of the micromirror, are formed with materials 91a and 91b with different permittivities. FIG. 9 shows the regions of the micromirror respectively face and correspond to the first and the second electrode parts of the single address electrode 33, are configured with the materials 91a and 91b with different permittivities in one mirror element 38 in the micromirror device according to the fifth preferred embodiment of the present invention. A micromirror 92 is formed as one piece to totally cover the surface of the micromirror by combining the materials 91a and 91b with different permittivities, which respectively correspond to the first and the second electrodes of the address electrode, is stacked on the surface of the micromirror positioned immediately below the micromirror 92 in order to enable the micromirror to reflect incident light. The materials 91a and 91b have different permittivities may be implemented to reflect the incident light to configure as a reflection mirror. Alternatively, a plate made of a material with high or low permittivity may be formed on either of the right and the left regions of the micromirror.

According to the fourth preferred embodiment of the present invention, a method for controlling the micromirror to deflect to the ON and the OFF light states is disclosed. In one mirror element 38 in the micromirror device the regions of the micromirror respectively correspond to the first and the second electrode parts of the single address electrode 33, are configured with the materials 91a and 91b with different permittivities. The controlling method according to this preferred embodiment is disclosed according to the controlling method described with reference to FIGS. 6A to 6E. The controlling method in the mirror element according to the fifth preferred embodiment is briefly described below.

The micromirror is deflected from the initial state with the micromirror held horizontally relative to the surface of the substrate 32 in the mirror element 38. FIG. 9 shows the micromirror is tilted to the side of the material with lower permittivity of the micromirror according to the equation (1) by applying a voltage to the address electrode 33. Because in the initial state of the micromirror A higher coulomb force F is applied to the side of the material with lower permittivity in comparison with the side of the material with higher permittivity. By temporarily reducing the voltage of the address electrode 33 to 0V, the micromirror is tilted from the initial state and starts to freely oscillate. By timely applying the voltage to the address electrode 33 when the micromirror becomes close to the first or the second electrode part during the free oscillation, the micromirror can be controlled to deflect to the ON or the OFF light side. As a result, the micromirror can be controlled to be held in the ON or the OFF light state.

In this case, the coulomb force F represented by the equation (1) is more intensified inversely proportional to the square of the distance r between the micromirror and the address electrode 33 than by the permittivity $\in$ of the material 91a or 91b with a different permittivity. The higher coulomb force is therefore applied to the side of the shorter distance r between the micromirror and the address electrode 33, whereby the micromirror is tilted to the ON or the OFF light side. Thus the micromirror can be controlled to deflect from the initial state to the OFF or the ON light state.

Also, according to the controlling method described with reference to FIGS. 6A to 6E, a method for controlling the micromirror to restore from the OFF or the ON light state to the initial state is disclosed. Namely, the micromirror can be restored from the ON or the OFF light state with the micromirror tilted and held to the initial state by applying a suitable pulsed voltage. This is implemented as follows: the micromirror 31 starts to freely oscillate by temporarily reducing the voltage of the side of the address electrode 33 holding the micromirror to 0V. Specifically, this is achieved by grounding the address electrode 33. It causes an acceleration reverse to the moving direction of the micromirror 31 and causing the coulomb force F to draw the micromirror back to the side opposite to the side to which the micromirror is moving when temporarily applying the voltage to the address electrode 33 as the distance r between the address electrode 33 and the micromirror 31 reaches a suitable point in the moving direction of the micromirror. Therefore, the micromirror can be restored to the initial state. By applying the pulsed voltage to the single address electrode 33 in this way, the micromirror can be restored from the ON or the OFF light state to the initial state.

Sixth Preferred Embodiment

The sixth preferred embodiment discloses the micromirror device including a plurality of mirror elements in each of which the micromirror can be controlled to deflect to the ON or the OFF light state with a coulomb force. The Coulomb force is generated by connecting an electrode to which a predetermined voltage is applicable to either of the regions of the micromirror. The regions of the electrode respectively face and correspond to the first and the second electrode parts that are respectively positioned on the right and the left sides of the deflection axis in the single address electrode disposed across the elastic hinge or the deflection axis of the micromirror.

Figure 10:
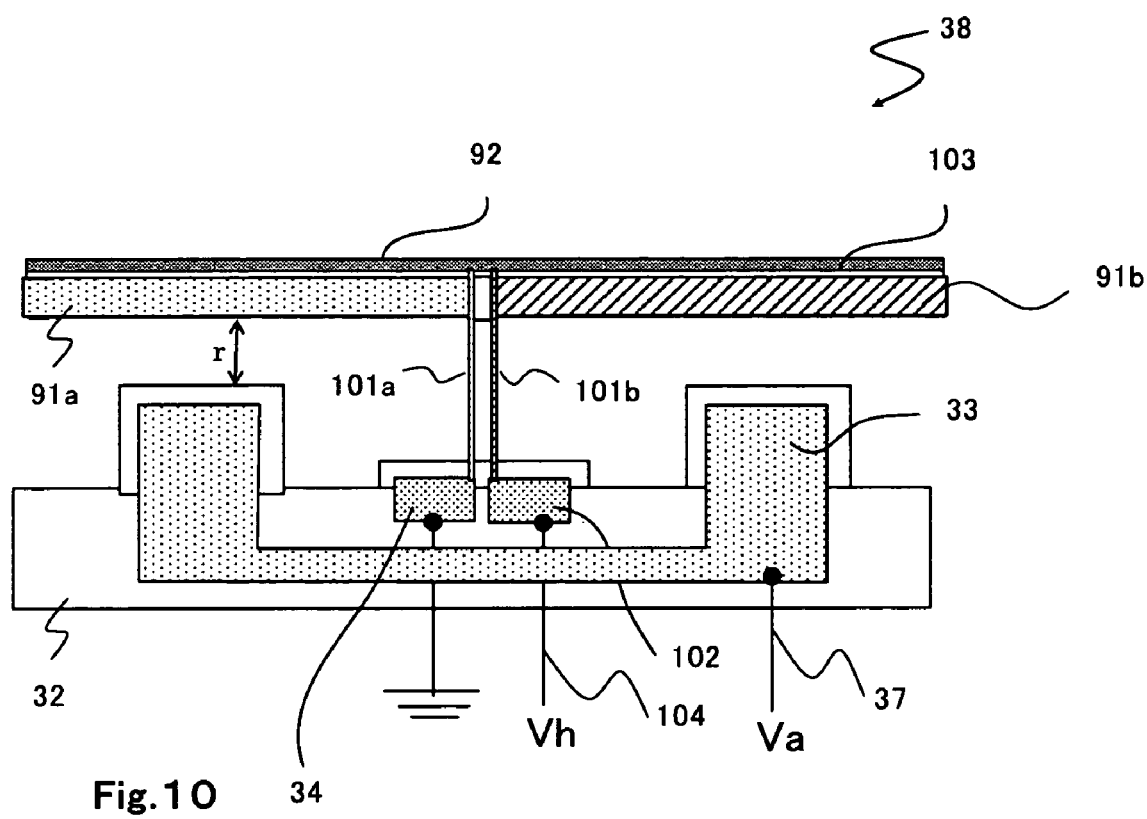
FIG. 10 is a schematic diagram of one mirror element in the micromirror device that shows the configuration where an elastic hinge for applying a voltage is connected to one of the two partitioned regions of the micromirror, which respectively correspond to the first and the second electrode parts of the single address electrode, according to one preferred embodiment of the present invention.

FIG. 10 shows the micromirror that deflects to the ON or the OFF light state by respectively insulating the regions 91a and 91b of the micromirror. The regions 91a and 91b respectively face and correspond to the first and the second electrode parts of the single address electrode 33. With a hinge 101b and by applying a predetermined voltage and a grounded hinge 101a to function as the two hinges respectively connected to the regions 91 and 91b of the micromirror in one mirror element 38 in the micromirror device according to the sixth preferred embodiment.

FIG. 10 depicts the mirror element 38 configured symmetrically with respect to the elastic hinge or the deflection axis of the micromirror while that the regions 91a and 91b of the micromirror respectively face and correspond to the first and the second electrode parts of the single address electrode 33, are implemented as conductor layers. The conductor layers are insulated almost at the middle of the micromirror in order for their separation. The two hinges such as the grounding hinge 101a and the hinge 101b to which the predetermined voltage is applicable are respectively connected to the regions 91a and 91b of the micromirror. An electrode 102 for applying the predetermined voltage is connected to the hinge 101b. A driving circuit 104c connected to the electrode 102 is provided in the micromirror device according to the sixth preferred embodiment of the present invention. Furthermore, the mirror element 38 may be made asymmetrical with respect to the elastic hinge or the deflection axis of the micromirror.

FIG. 10 shows the regions 91 and 91b of the micromirror respectively face and correspond to the first and the second electrode parts of the single address electrode 33, are insulated to prevent them from being electrically continuous, and the two hinges such as the grounding hinge 101a and the hinge 101b to which the predetermined voltage is applicable are respectively connected to the regions 91a and 91b of the micromirror. The hinge 101b is further connected to the electrode 102 for applying the predetermined voltage via the driving circuit 104 in one mirror element in the micromirror device according to the sixth preferred embodiment of the present invention.

Additionally, an insulator 103 formed as one piece for covering the micromirror regions 91a and 91b on the ON and the OFF light sides is stacked on the surface of the micromirror configured with the micromirror regions 91a and 91b. These regions respectively correspond to the first and the second electrode parts of the address electrode 33. The micromirror 92 is further stacked on the insulator 103 in order to enable the micromirror 92 to reflect incident light. The insulator 103 may be configured with a reflective material and implemented as a reflection mirror. Furthermore, the micromirror regions 91a and 91b may be implemented as reflection mirrors with a surface for reflection.

According to the sixth preferred embodiment of present invention, a method for controlling the micromirror 92 to deflect to the ON or the OFF light state in one mirror element 38 is described. The method is achieved by connecting the two hinges such as the grounding hinge 101a for the micromirror region 91a, and the hinge 101b that can apply the predetermined voltage to the other micromirror region respectively to the regions 91a and 91b of the micromirror. These two regions respectively face and correspond to the first and the second electrode parts of the single address electrode 33, in the micromirror device The controlling method according to this preferred embodiment is briefly described based on the controlling method described with reference to FIGS. 6A to 6E.

When the micromirror 92 is deflected from the initial state, predetermined voltages are applied to the electrode 102 and the address electrode 33 in order to apply a voltage to the micromirror region 91 on one side of the micromirror via the hinge 101b. By applying to the electrode 102 the voltage with the same polarity as that applied to the address electrode 33, the micromirror can be tilted in the side opposite to the side to which the voltage is applied. Because the potential difference between the address electrode 33 and the micromirror region to which the voltage is applied becomes smaller than that applied between the address electrode 33 and the micromirror region. The voltage is not applied in the micromirror to the regions respectively correspond to the first and the second electrode parts of the address electrode 33, in the initial state, and the amount of charge q in the equation (1) therefore becomes small, whereby a higher coulomb force F is applied to the opposite side.

Because even when the voltage applied to the electrode 102 is equal to or lower than that applied to the electrode 33, a reduction in the drawing force implemented by the Coulomb force F is required. Additionally, the micromirror region 91b acts as the address electrode. The micromirror can be controlled by applying no voltage to the electrode 102 when the micromirror is deflected to the side of the region 91b and stopped by making contact with the electrode 33, or by applying the same voltage as the electrode 33 to the electrode 102 (or by reducing the drawing force implemented by the coulomb force) when the micromirror is deflected to the opposite side. Additionally, the micromirror can be switched on/off by suitably addressing the electrodes 33 and 102 according to an image signal corresponding to each mirror pixel.

Furthermore, a person having ordinary skill in the art can easily understand that the micromirror can be controlled in the aforementioned way also by implementing a configuration where the region 91b made to act as the electrode corresponding to the address electrode 33 is extended to the side of the region 91a. When the voltage according to an address signal from an image signal is applied the address voltage from the image signal is prevented from being applied by grounding the electrode 33.

At this time, the micromirror can be controlled to deflect to the ON or the OFF light side by generating a difference between coulomb forces F by applying the voltages to both the micromirror and the address electrode 33. The micromirror tilted from the initial state starts to freely oscillate by temporarily reducing the voltages of the micromirror and the address electrode to 0V. By timely applying the voltages to the address electrode 33 and/or the micromirror via the hinge 10b that is connected to the micromirror and can apply the predetermined voltage when the micromirror 31 becomes close to the first or the second electrode part of the address electrode 33 during the free oscillation. The micromirror 31 can be held on the ON or the OFF light side. As a result, the micromirror can be controlled to deflect to the ON or the OFF light state.

This is implemented as follows: the square of the distance r between the micromirror and the address electrode 33 is a dominant factor in the equation (1). The higher coulomb force is therefore applied to the side of the shorter distance r between the address electrode 33 and the micromirror, whereby the micromirror can be titled to the ON or the OFF light side. In this way, the mirror element in the sixth preferred embodiment is controlled to change from the initial state to the OFF or the ON light state.

Also, according to the controlling method described with reference to FIGS. 6A to 6E, a method for controlling the micromirror to restore from the OFF or the ON light state to the initial state is disclosed. Namely, by temporarily reducing the potential difference between the micromirror and the address electrode to 0V in the ON or the OFF light state, the micromirror starts to freely oscillate where the micromirror is tilted and held. Then, the coulomb force F draws the micromirror back to the side opposite to the side to which the micromirror is moving by temporarily applying a suitable voltage to the address electrode 33 and/or the hinge 101b connected to the micromirror and can apply the predetermined voltage when the distance r between the address electrode 33 and the micromirror 31 reaches a suitable point in the moving direction of the freely oscillating micromirror. An acceleration that is reverse to the moving direction of the micromirror is generated, whereby the micromirror can be restored to the initial state. Namely, the micromirror 31 can be restored from the ON or the OFF light state to the initial state by applying a pulsed voltage to the address electrode 33 and/or the hinge 101b that is connected and can apply the predetermined voltage.

Seventh Preferred Embodiment

The seven preferred embodiment according to the present invention discloses the micromirror device that can control the micromirror to deflect to the ON or the OFF light state with a coulomb force by forming an address electrode as one piece in one mirror element. The micromirror has flat surface for reflecting incident light. The regions of the micromirror respectively face and correspond to the first and the second electrode parts of the single address electrode across the elastic hinge or the deflection axis of the micromirror have different thickness.

Figure 11:
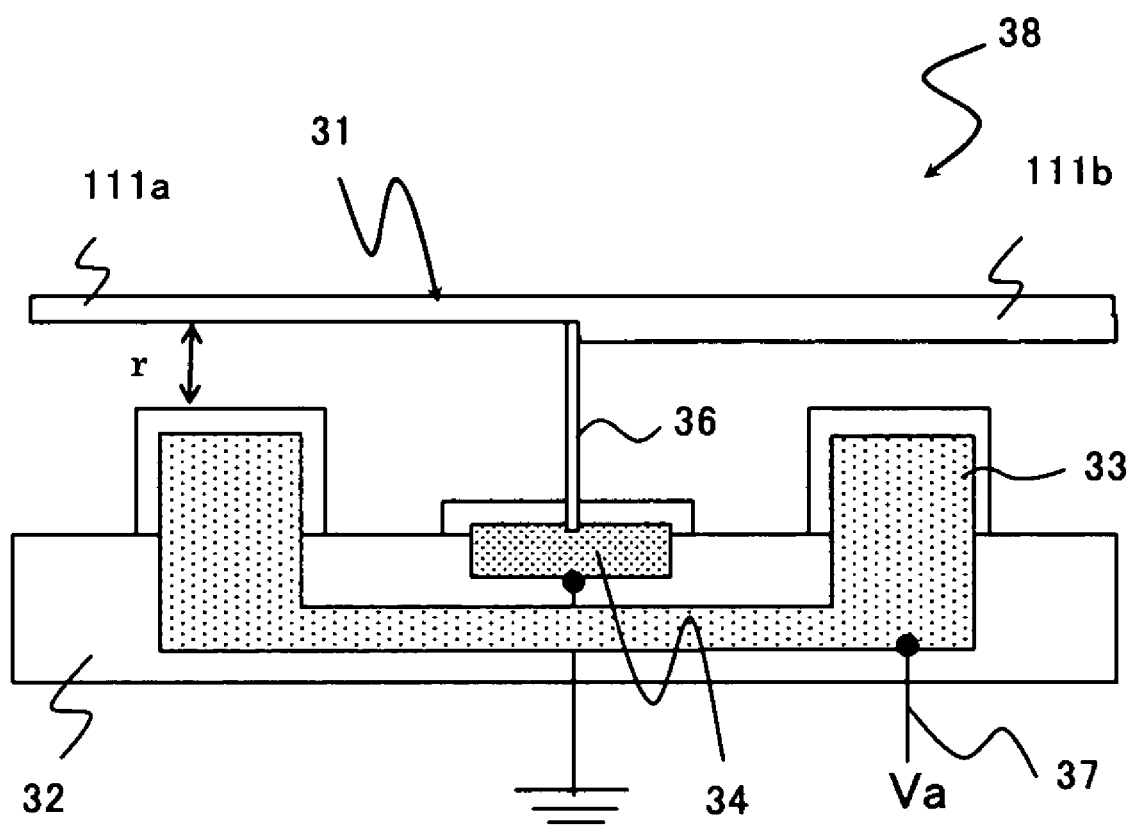
FIG. 11 is a schematic diagram of one mirror element in the micromirror device that shows the configuration where the thicknesses of the regions of the micromirror, which respectively face and correspond to the first and the second electrode parts of the single address electrode differ, according to one preferred embodiment of the present invention.

FIG. 11 shows the micromirror 31 controlled to deflect to the ON or the OFF light state with regions 111a and 111b of the r micromirror. The regions 111a and 111b respectively face and correspond to the first and the second electrode parts of the single address electrode 33 across the elastic hinge or the deflection axis of the micromirror. FIG. 11 depicts the mirror element 38 configured symmetrically with respect to the elastic hinge 36 or the deflection axis of the micromirror while that the regions 111a and 111b of the regions of the micromirror respectively face and correspond to the first and the second electrode parts of the single address electrode 33 have different thicknesses.

In the configuration shown in FIG. 11, the regions 111a and 111b of the regions of the micromirror respectively face and correspond to the first and the second electrode parts of the single address electrode 33 have different thicknesses the mirror element in the micromirror device according to the seventh preferred embodiment of the present invention. The lower surface of the micromirror may be reconfigured to make the regions 111a and 111b of the micromirror respectively face and correspond to the first and the second electrode parts of the single address electrode 33 have different thicknesses.

According to the seventh preferred embodiment of the present invention, a method for controlling the micromirror 31 to deflect to the ON or the OFF light state is disclosed. The regions 111a and 111b of the micromirror respectively face and correspond to the first and the second electrode parts of the single address electrode 33 across the elastic hinge or the deflection axis of the micromirror have different thicknesses in one mirror element 38 in the micromirror device. The controlling method for the micromirror 31 in this preferred embodiment is described according to the controlling method described with reference to FIGS. 6A to 6E. The controlling method in the mirror element in the seventh preferred embodiment is briefly described below.

According to the equation (1), by applying a voltage to the address electrode 33, the micromirror 31 is deflected from the initial state and tilted to the thicker side 11b of the region of the micromirror corresponding to the address electrode 33. This is because the square of the distance r between the micromirror 31 and the address electrode 33 functions as a dominant factor in the equation (1). A higher coulomb force F is therefore applied to the side of the shorter distance r between the address electrode 33 and the thicker side 111a of the micromirror in comparison with the thinner side 111a of the micromirror in the initial state. The micromirror tilted form the initial state starts to freely oscillate by temporarily reducing the voltage of the address electrode 33 to 0V. The micromirror 31 can be held on the ON or the OFF light side that is the first or the second electrode by timely applying a suitable voltage to the address electrode 33 when the freely oscillating micromirror 31 becomes close to the ON or the OFF light side of the address electrode, whereby the micromirror can be deflected to the ON or the OFF light state. Specifically, the coulomb force F represented by the equation (1) is more intensified by the square of the distance r between the micromirror 31 and the address electrode 33. A higher coulomb force F is applied to the side of the shorter distance r between the address electrode 33 and the micromirror 31, whereby the micromirror 31 can be tilted to the ON or the OFF light side. In this way, the micromirror 31 can be controlled to deflect from the initial state to the OFF or the ON light state.

With reference to FIGS. 6A to 6E, a method for controlling the micromirror 31 to restore from the OFF or the ON light state to the initial state is disclosed. Namely, by applying a suitable pulsed voltage in the ON or the OFF light state of the micromirror 31, the micromirror 31 can be restored to the initial state. This is implemented as follows: the micromirror 31 starts to freely oscillate by temporarily reducing to 0V the voltage applied to the address electrode 33 while holding the micromirror 31 to 0V. An acceleration reverse to the moving direction of the micromirror 31 is generated because the Coulomb force F that draws the micromirror 31 back to the side opposite to the side to which the freely oscillating micromirror is moving. By temporarily applying the voltage to the address electrode 33 when the distance r between the address electrode 33 and the micromirror reaches a suitable point while the micromirror 31 is moving from the electrode side holding the micromirror 31 to the other electrode side, the micromirror 31 can be restored to the initial state. Accordingly, by applying the pulsed voltage to the single address electrode 33, the micromirror 31 can be restored from the ON or the OFF light state to the initial state.

Eighth Preferred Embodiment

The eighth preferred embodiment discloses the micromirror device where the micromirror can be controlled to deflect to the ON or the OFF light state. A coulomb force is combined with the elasticity of elastic hinges by using elastic members with different elasticity coefficients respectively for the deflection directions of the micromirror. The address electrode across the elastic hinge or the deflection axis of the micromirror is formed as one piece in one mirror element.

Figure 12:
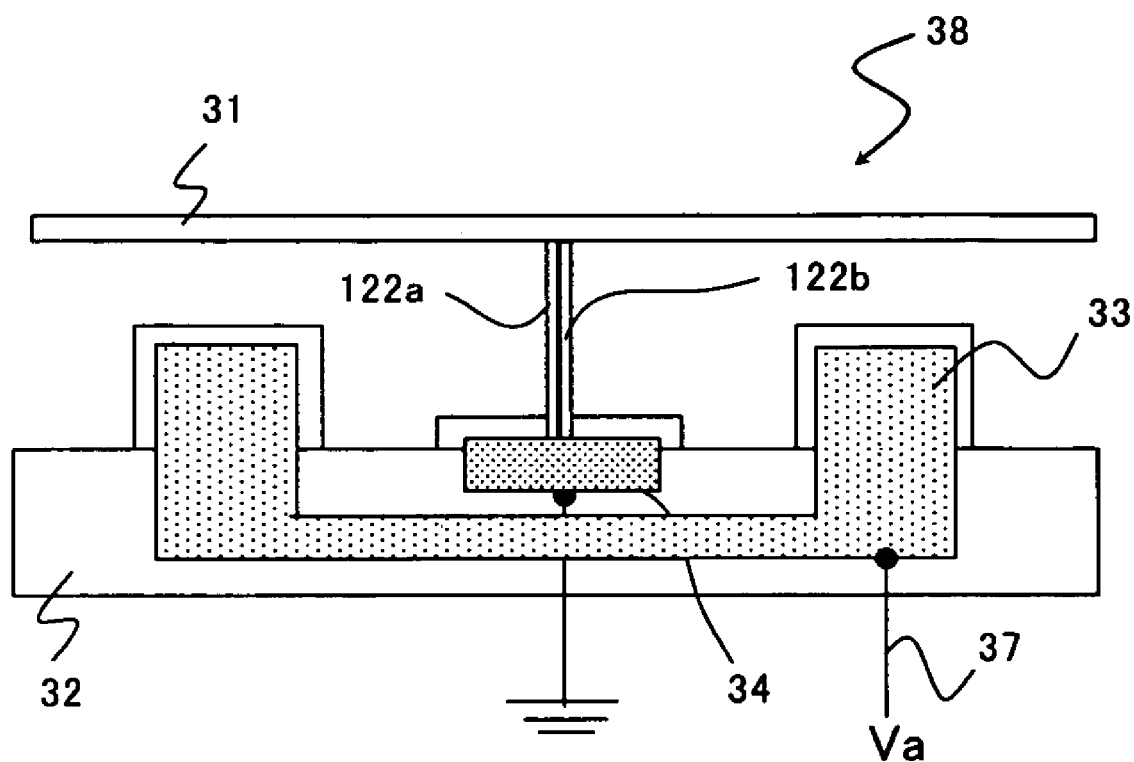
FIG. 12 is a schematic diagram of one mirror element in the micromirror device that shows the configuration where the elasticity coefficients of the elastic hinge are different, respective to the different deflection directions of the micromirror, according to one preferred embodiment of the present invention.

In the configuration shown in FIG. 12, the micromirror 31 can be controlled to deflect to the ON or the OFF light state by using the elastic hinges 122a and 122b with different elasticity coefficients respectively for the first and the second electrode parts of the single address electrode 33 in one mirror element 38 of the micromirror device according to the eighth preferred embodiment of the present invention.

FIG. 12 depicts the mirror element 38 configured with the elastic hinges 122a and 122b with different elasticity coefficients respectively for the first and the second electrode parts of the single address electrode 33. The mirror element 38 is configured asymmetrically with respect to the deflection axis of the micromirror. The elastic hinges 122a and 122b with different elasticity coefficients may be combined into one elastic hinge, or partitioned and used as a plurality of elastic hinges.

Specifically, the hinges disclosed in this preferred embodiment are of a vertical cantilever type. Therefore, the surfaces of the right and the left hinges expand or contract when the micromirror deflects to the right or the left side. These hinges are configured to transform into different shapes when deflected to different tilt angles.

According to the eighth preferred embodiment of the present invention, FIG. 12 shows the elastic hinges with different forces for deflecting the micromirror to the right and the left sides are used respectively for the first and the second electrode parts of the address electrode 33 in the mirror element of the micromirror device. By forming the hinges with different elasticities respectively for the sides of the first and the second electrode parts of the single address electrode 33, it becomes easier to deflect the micromirror 31 to one side. The sizes and the heights of the electrode parts of the address electrode can be significantly changed. According to the eighth preferred embodiment of the present invention, a method is described for controlling the micromirror 31 to deflect to the ON or the OFF light state when the elastic hinges with different elasticity coefficients are used respectively for the sides of the first and the second electrode parts of the single address electrode 33 in one mirror element 38 of the micromirror device By applying a voltage to the address electrode 33, the micromirror 31 is deflected from the initial state and the micromirror is tilted to the side of the electrode part with the larger area or height of the address electrode 33 arranged asymmetrically with the elastic hinge or the deflection axis of the micromirror. The micromirror 31 tilted from the initial state to one side starts to freely oscillate when temporarily reducing the voltage of the single address electrode 33 to 0V. By timely applying a suitable voltage to the single address electrode 33 when the freely oscillating micromirror 31 moves close to the electrode part on the ON or the OFF light side of the address electrode, the micromirror 31 can be held on the ON or the OFF light side closer to the first or the second electrode part side. As a result, the micromirror can be deflected to the ON or the OFF light state.

This is implemented as follows: the Coulomb force F represented by the equation (1) described with reference to FIG. 6A is reversely proportional the square of the distance r between the address electrode 33 and the micromirror 31. A higher coulomb force is therefore applied by reducing the distance between the address electrode 33 and the micromirror 31. Therefore, the micromirror 31 is tilted to the ON or the OFF light side when the distance r between the address electrode 33 and the micromirror 31 becomes short. As a result, the micromirror 31 can be controlled to deflect from the initial state to the OFF or the ON light state.

According to the controlling method described with reference to FIG. 6D or 6E a method for controlling the micromirror 31 to restore from the OFF or the ON light state to the initial state is disclosed. Specifically, by applying a suitable pulsed voltage to the address electrode 33 in the ON or the OFF state of the micromirror 31, the micromirror 31 can be restored to the initial state.

This is implemented as follows: the micromirror 31 starts to freely oscillate when temporarily reducing the voltage of the address electrode 33 part holding the micromirror 31 to 0V. An acceleration reverse to the moving direction of the freely oscillating micromirror 31 is generated by causing the coulomb force F to draw the micromirror 31 back to the side opposite to the side to which the micromirror 31 is moving because of temporarily applying the voltage to the address electrode 33. When the distance r between the address electrode 33 and the micromirror 31 reaches a suitable point while the freely oscillating micromirror 31 is moving from the side thus holding the micromirror 31 toward the other side, whereby the micromirror can be restored to the initial state. In this way, the micromirror 31 can be restored from the ON or the OFF light state to the initial state by applying the pulsed voltage to the single address electrode 33.

It can be easily understood by those of ordinary skill in the art that the deflection speed of the micromirror or the length of time required for the micromirror to deflect at a maximum angle vary by each deflection direction since the elasticity coefficients are different depending on a deflection direction. With such a difference of the deflection speed or the length of time exerts an influence, the micromirror is controlled with special considerations concerning the timing of mirror control. The same applies also to the case where the shape of the micromirror, or the waveform of a voltage applied to the micromirror is asymmetrical with respect to the deflection axis of the micromirror.

Ninth Preferred Embodiment

The ninth preferred embodiment discloses the micromirror device where the address electrode is formed as one piece, The micromirror is controlled to deflect to the ON or the OFF light state with a coulomb force by arranging an elastic hinge for supporting the micromirror in a position away from the gravity center of the micromirror.

Figure 13A:
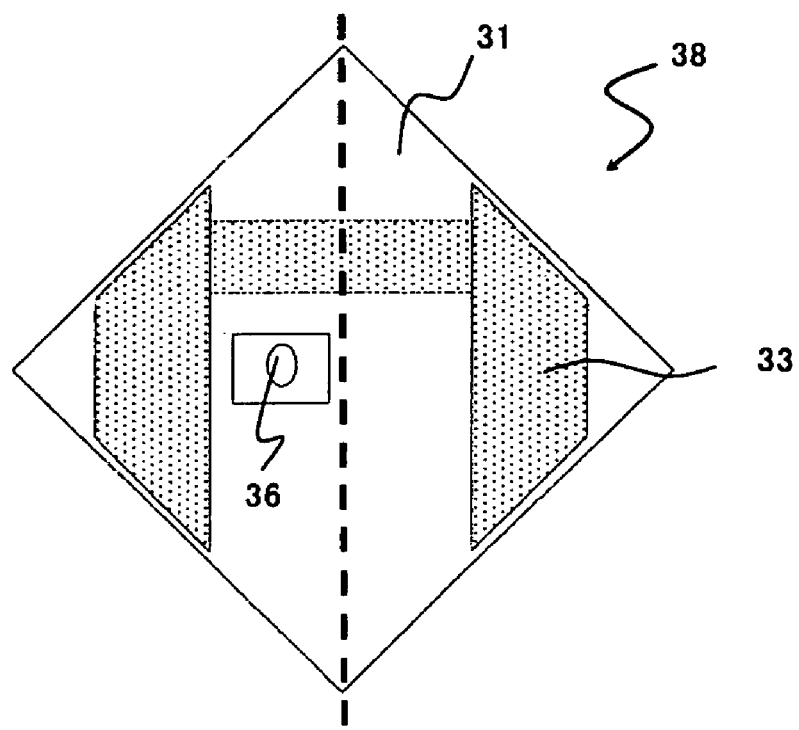
FIG. 13A is a schematic diagram of one mirror element in the micromirror device that shows the correspondence between the areas of the micromirror and the address electrode (beneath the mirror), and the position of an elastic hinge when the mirror element is viewed in the direction of Z of FIG. 3, in the case where the elastic hinge supporting the micromirror is arranged in a position offset from the center of the micromirror, according to one preferred embodiment of the present invention.

FIG. 13A shows the correspondence between the areas of the micromirror and the elastic hinge when the mirror element 38 is viewed in the direction Z of FIG. 3. According to the ninth preferred embodiment of the present invention, the elastic hinge for supporting the micromirror is placed in the position that is away from the gravity center of the micromirror in the mirror element 38 in the micromirror device.

Figure 13B:
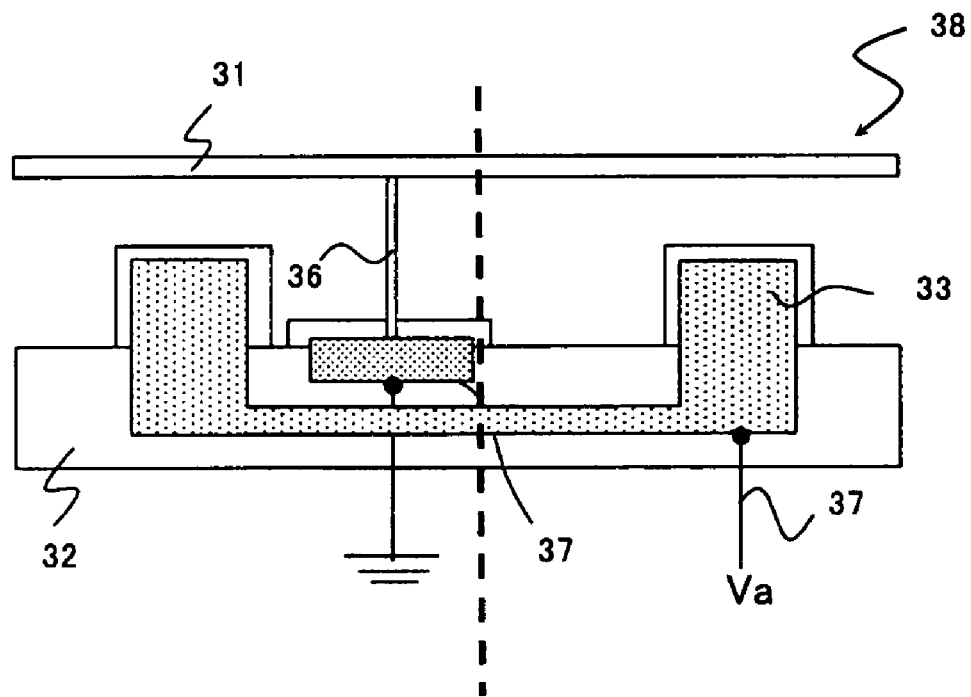
FIG. 13B is a cross-sectional view of the mirror element shown in FIG. 13A taken along the line IV-IV of FIG. 3.

FIG. 13B is a cross-sectional view of the mirror element 38 shown in FIG. 13A and taken along the line IV-IV of FIG. 3. FIG. 13A shows the address electrode 33 formed as one piece, and the elastic hinge for supporting the micromirror is formed in the position away from the gravity center of the micromirror in the mirror element. FIG. 13B is a cross-sectional view of the mirror element 38 shown in FIG. 13A and taken along the line IV-IV of FIG. 3. This figure shows the configuration where the single address electrode 33 positioned below the micromirror 31 is formed as one piece on the substrate 32, and the elastic hinge for supporting the micromirror is formed in the position away from the gravity center of the micromirror.

In this configuration, the micromirror 31 and the address electrode 33 are configured symmetrically with respect to an axis that is parallel to the deflection axis of the micromirror and passes through the gravity center. The elastic hinge is formed in the position that is away from the gravity center of the micromirror 31. The elastic hinge is made to support the micromirror. Even when the coulomb forces generated respectively between the micromirror 31 and the electrode parts of the address electrode 33 are made equal, mirror movements along either directions differ. Therefore, the force for deflecting the micromirror to the side including the gravity center is more intensified. This can make the forces for deflecting the micromirror to the right and the left sides of the elastic hinge different, whereby the micromirror can be controlled to deflect to the ON or the OFF light state with a controlling method similar to that executed when the coulomb forces are different.

In FIGS. 13A and 13B, the mirror element 38 is configured symmetrically with respect to the axis that is parallel to the deflection axis of the micromirror device and passes through the gravity center. The elastic hinges for supporting the micromirror is formed in the position away from the gravity enter of the micromirror. The configuration shown in FIGS. 13A and 13B is described based on the assumption that both the micromirror and the address electrode have shapes or properties symmetrical with respect to the axis that is parallel to the deflection axis of the micromirror and passes through the gravity center. Furthermore, the areas, etc. of the address electrode may be made asymmetrical except that the elastic hinge for supporting the micromirror 31 is arranged in the position away from the gravity center of the micromirror.

According to the ninth preferred embodiment of the present invention, a method for controlling the micromirror to deflect to the ON or the OFF light state in the mirror element where the address electrode is formed as one piece, and the elastic hinge for supporting the micromirror is arranged in the position away from the gravity center is described.

When the micromirror 31 is deflected from the initial state, the micromirror 31 is tilted toward the side of the elastic hinge with larger moment when applying a voltage to the address electrode 33. Then, the micromirror 31 starts to freely oscillate by temporarily reducing the voltage of the single address electrode 33 to 0V. By timely applying a suitable voltage to the single address electrode 33 when the freely oscillating micromirror 31 comes close to the ON or the OFF light side of the address electrode, the micromirror 31 can be held on the ON or the OFF light side that is the first or the second electrode part. As a result, the micromirror 31 can be deflected to the ON or the OFF light state. Because the micromirror 31 can be tilted to the ON or the OFF light side as shown in FIG. 6A by making the moment corresponding to the coulomb force F represented by the equation (1) of the electrode part on one side of the micromirror larger than that on the opposite side. Accordingly, the micromirror 31 can be controlled to deflect from the initial state to the OFF or the ON light state.

Also a method for controlling the micromirror 31 from the OFF or the ON light state to the initial state is therefore disclosed according to the controlling method described with reference to FIG. 6D or 6E. Specifically, by applying a suitable pulsed voltage to the address electrode 33 in the ON or the OFF light state of the micromirror 31, the micromirror 31 can be restored to the initial state. This is implemented as follows: the micromirror 31 starts to freely oscillate when temporarily reducing to 0V the voltage on the side of the address electrode 33 part holding the micromirror 31. An acceleration reverse to the moving direction of the micromirror 31 is generated because the moment caused by the Coulomb force F that draws the micromirror back to the side opposite to the side of the freely oscillating micromirror 31. This occurs when the distance r between the address electrode 33 and the micromirror 31 reaches a suitable point while the freely moving micromirror 31 is moving from the side holding the micromirror 31 toward the other side, whereby the micromirror 31 can be restored to the initial state. In this way, the micromirror 31 can be restored from the ON or the OFF light state to the initial state by applying the pulsed voltage to the single address electrode 33.

According to the first to the ninth preferred embodiments described above, the mirror elements in the micromirror devices is controlled by applying the voltage to the single address electrode. A person having ordinary skill in the art can easily understand that the deflection of the micromirror can be controlled also by grounding the address electrode, and by applying the voltage to the micromirror implemented as a conductor. For example, by grounding the address electrode, and by applying the pulsed voltage to the micromirror at designated timing, the micromirror can be restored to the initial state. Additionally, a person having ordinary skill in the art can easily understand that the tilt of the micromirror can be controlled by applying voltages to both the single address electrode and the micromirror, and that the deflection of the micromirror can be controlled in a similar manner by providing the address electrode only on the back of the micromirror.

Tenth Preferred Embodiment

The tenth preferred embodiment discloses the configuration implemented by adding in the first to the ninth preferred embodiments an electrode for detecting the position of the micromirror or for determining the timing to change the operation of the micromirror when the micromirror makes contact with the electrode and further describes the principle for detecting the position of the micromirror. The detection of the position of the micromirror referred to in this invention is to detect that the micromirror is tilted to the ON or OFF light side, or neither of the sides, or to determine the timing for the micromirror in changing from the deflected state to another state.

The tenth preferred embodiment disclosed a micromirror that is tilted by the coulomb force generated between the first or the second electrode part and the address electrode when applying a voltage to the single address electrode, whereby the micromirror can be deflected to the ON or the OFF light state.

The configuration in the tenth preferred embodiment is implemented by further providing another electrode that has the height for enabling the micromirror to make contact when tilting. The electrode is dedicated to the position detection of the micromirror outside either or both of the ON and the OFF light sides in the mirror elements in the first to the ninth preferred embodiments.

Figure 14:
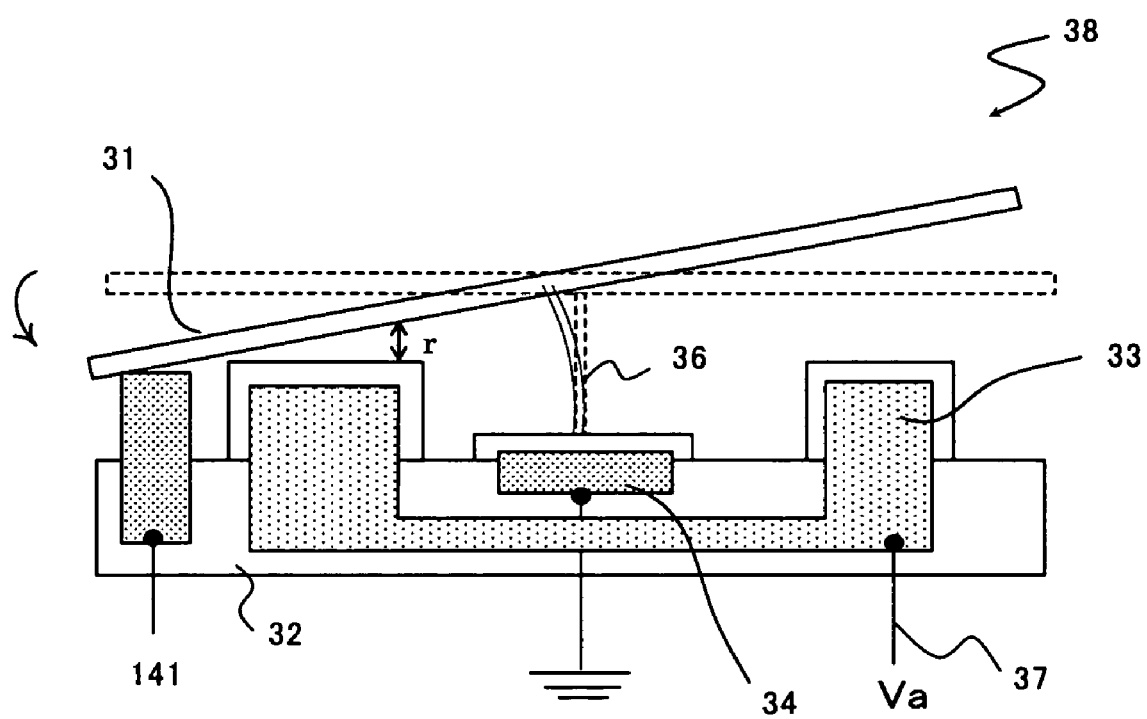
FIG. 14 is a schematic diagram of one mirror element in a micromirror device that shows the configuration implemented by adding an electrode for detecting the position of the micromirror or for changing the operation of the micromirror to one side of the element shown in FIG. 4A, according to one preferred embodiment of the present invention.

FIG. 14 shows an example of the configuration where the electrode 141 that is dedicated to a function of position detection of the micromirror 31 or to determine the timing to change the operation of the micromirror when the micromirror contacts the electrode. This electrode for detection is added outside of the area of the address electrode in one mirror element in the micromirror device shown in FIG. 4A. The position or the micromirror 31 can be detected or the timing to change the operation of the micromirror can be determined according to the principle of observing whether or not the micromirror 31 and the electrode 141 are electrically continuous or a slight change occurs in the potential difference when the micromirror 31 makes contact with the electrode 141 in the aforementioned arrangement.

Depending on the detection method, the electrode 141 may be grounded, or a voltage may be applied to make a predetermined current flow to the electrode 141 when the micromirror makes contact with the electrode. For example, the charge stored in the micromirror is discharged at the moment when the micromirror 31 makes contact with the electrode 141. The Coulomb force applied between the address electrode 33 and the micromirror 31 is terminated whereby holding the micromirror in one deflection state can be prevented even when the micromirror deflects to the side including the electrode 141. As a result, the micromirror 31 once deflected toward the electrode 141 can be deflected in the opposite direction when the micromirror 31 makes contact with the electrode 141. It is possible to hold the micromirror in the deflection state by grounding the electrode 141. This eliminates the need for strictly controlling, for example, the time $T_7$ shown in FIG. 6C at which the voltage applied to the electrode 33 is reduced to 0V. Moreover, the duration for holding the micromirror in a predetermined direction can be minimized.

Furthermore, the transfer speed of charge to the region of the electrode 141 with which the micromirror makes contact is adjusted by providing a protection film with high resistivity, etc., whereby the transfer time of charge stored in the micromirror 31 can be changed, and in turn the time required for changing the coulomb force can be adjusted. This is effective also when this configuration is used for an experiment, etc. of the control of the ON/OFF light of the micromirror 31.

In this embodiment, the electrode 141 is dedicated to the function of position detection of the micromirror 31 and is placed outside the address electrode 33. However, the electrode 141 may be arranged inside and used as a stopper.

Alternatively, the position of the micromirror 31 can be detected by adding the address electrode dedicated to the position detection of the micromirror to the conventional configuration where two address electrodes are used in one mirror element.

With the micromirror controlled in this way, the tilting position of the micromirror can be securely controlled against a possible change in the tilting state caused by a disturbance (such as a physical impact caused by a hit, a drop, etc.) of the micromirror. Furthermore, the micromirror may be controlled and held in the ON or the OFF light state according to the timing of the voltage applied to the address electrode.

Eleventh Preferred Embodiment

The eleventh preferred embodiment discloses the micromirror device where the micromirror is controlled to tilt with the coulomb force generated between the first or the second electrode part of the single address electrode to which the voltage is applied. The micromirror is controlled to always tilt to a particular ON or OFF light state regardless of the current state of the micromirror.

The eleventh preferred embodiment also discloses a method for controlling the micromirror to always deflect to the ON or the OFF light state by making a voltage applied to the address electrode or micromirror multilevel regardless of the current state of the micromirror.

According to the eleventh preferred embodiment of the present invention, a method for controlling the micromirror to always deflect to a particular deflection state regardless of the currently tilting state of the micromirror, and a method for controlling the micromirror by making a voltage multilevel in one mirror element in the micromirror device are described below.

Figure 15A:
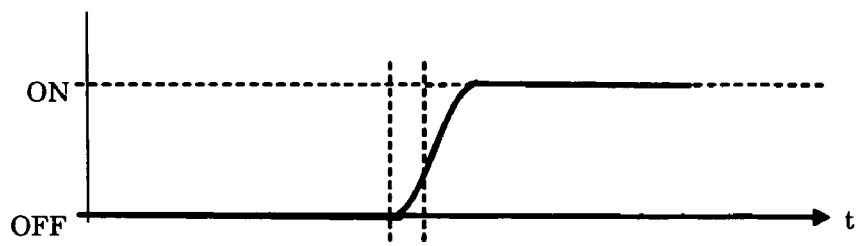
FIG. 15A is a chart that exemplifies a method for controlling the micromirror to change from the OFF to the ON light state by applying a multilevel voltage to the address electrode and/or the micromirror of a mirror element in the micromirror device, according to the present invention.
Figure 15B:
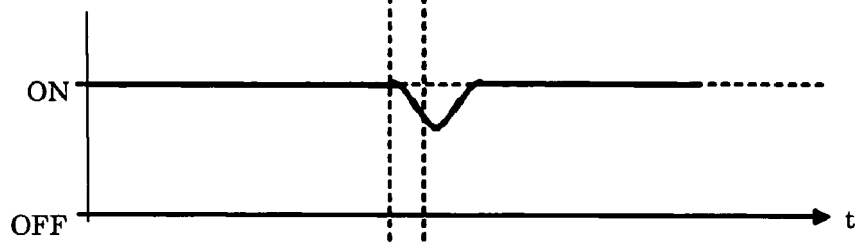
FIG. 15B a charts that exemplifies a method for controlling the micromirror to be held in the ON light state by applying a multilevel voltage to the address electrode and/or the micromirror of a mirror element in the micromirror device, according to the present invention.
Figure 15C:
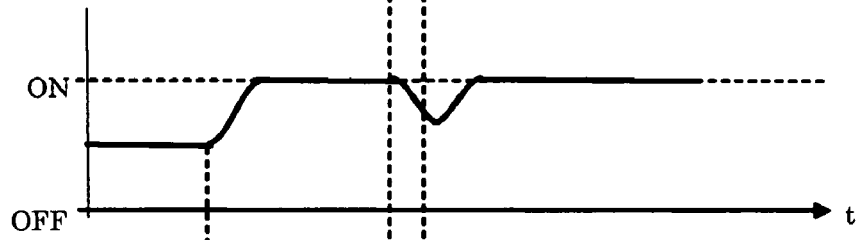
FIG. 15C is a chart that exemplifies a method for controlling the micromirror to change from the intermediate light state to the ON light state by applying a multilevel voltage to the address electrode and/or the micromirror of a mirror element in the micromirror device, according to the present invention.
Figure 15C:
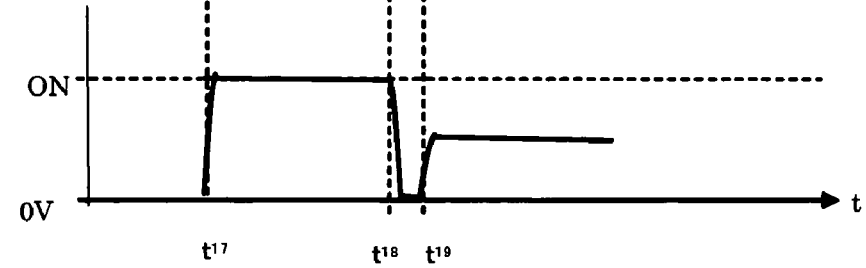

According to the first to the tenth preferred embodiments, FIGS. 15A to 15D are charts for representing the controlling method to hold the micromirror in the ON light state regardless of the current state such as the ON light state of FIG. 15A, the OFF light state of FIG. 15B, or the intermediate light state of FIG. 15C of the micromirror by using a multilevel voltage.

FIGS. 15A to 15E assume that the address electrode or the micromirror is configured so that the coulomb force applied between the electrode part on the ON light side of the address electrode and the micromirror becomes higher than that applied between the electrode part on the OFF light side of the address electrode and the micromirror. In order to apply the multilevel voltage to the micromirror, the address electrode may be grounded.

Figure 15D:
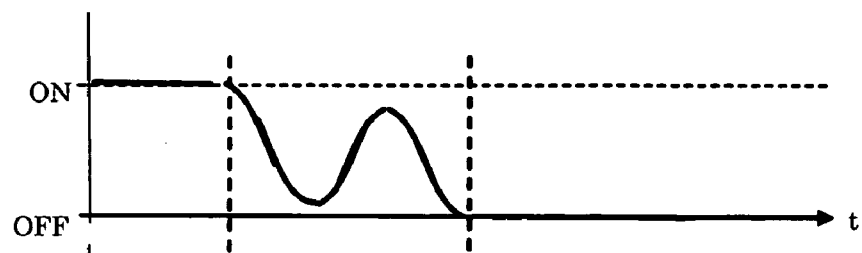
FIGS. 15D and 15E are charts that exemplifies a method for controlling the micromirror to change from the ON light state to the OFF light state by applying a multilevel voltage to the address electrode and/or the micromirror of a mirror element in the micromirror device, according to the present invention.

FIG. 15A shows a method to control the micromirror to deflect from the OFF light state to the ON light state. FIG. 15 shows a method for controlling the micromirror to deflect from the ON light state again to the ON light state as shown in FIG. 15B. FIG. 15C shows a method for controlling the micromirror to deflect from the initial state that is the intermediate light state to the ON light state. FIG. 15D shows a method for controlling the micromirror to deflect from the ON light state to the OFF light state. The control method are implemented by using the multilevel voltage is described with reference to FIGS. 15A to 15D showing the chart that represents the position of the micromirror along with the chart that represents the voltage of the address electrode in the same elapse of time indicated by a time axis t.

The vertical axis of the chart that represents the position of the micromirror indicates a move to the side of the ON or the OFF light state with respect to the intermediate light state as the initial state. The vertical axis of the chart represents the voltage of the address electrode indicates the state where the voltage is applied to the address electrode as the ON state with respect to the initial state of 0V. The horizontal axes of both of the charts are the time axis t indicating the elapse of time.

FIG. 15A shows a controlling method for deflecting the micromirror from the OFF to the ON light state by making the voltage applied to the address electrode and/or the micromirror multilevel. The method for controlling the micromirror to deflect from the OFF to the ON light state is described below with reference to the charts of FIG. 15A. With this method, the micromirror is held in the OFF light state up to a time $t_{18}$ by applying the voltage to the address electrode and/or the micromirror after the initial operations described in the second preferred embodiment are performed. The micromirror starts to freely oscillate and when the voltage of the address electrode and/or the micromirror is reduced to 0V.

A lower voltage than that used in the initial state of the micromirror is applied to the address electrode and/or the micromirror at a time $t_{19}$ when the distance between the OFF light side of the address electrode and the micromirror becomes shorter than that between the ON light side of the address electrode and the micromirror. The voltage is applied when the freely oscillating micromirror is moving away from the ON light side of the address electrode. The sum of the inertial force of the micromirror and the coulomb force applied between the ON light side of the address electrode and the micromirror becomes larger than the coulomb force applied between the OFF light side of the address electrode and the micromirror. Therefore, the micromirror is tilted toward the ON light side of the address electrode while its speed is being slowed down, whereby the micromirror can be deflected to the ON light state. In this way, a multilevel voltage applied to the address electrode is implemented for controlling the micromirror.

FIG. 15B shows a controlling method for holding the micromirror in the ON light state by making the voltage applied to the address electrode and/or the micromirror multilevel.

Similar to FIG. 15A, the micromirror is held in the ON light state up to the time $t_{18}$ by applying the voltage to the address electrode and/or the micromirror after the initial operations described in the second preferred embodiment. The micromirror starts to freely oscillate thereafter when reducing the voltage of the address electrode and/or the micromirror to 0V.

A lower voltage than that used in the initial state is applied to the address electrode and/or the micromirror at the time $t_{19}$ when the distance between the ON light side of the address electrode and the micromirror becomes shorter than that between the OFF light side of the address electrode and the micromirror. The freely oscillating micromirror is moving away from the ON light side of the address electrode toward the OFF light side of the address electrode. The micromirror can be controlled to restore to the ON light state. This can be also understood according to the above principle described with reference to FIG. 15A. Similar operations can be started in the OFF light state.

FIG. 15C shows the controlling method for changing the micromirror from the initial state to the ON light state, and for holding the micromirror in the ON light state. This is achieved by applying a multilevel voltage to the address electrode and/or the micromirror. FIG. 15C is a timing diagram for showing the method for controlling the micromirror 31 to deflect from the initial state to the ON light state and for holding the micromirror in the ON light state is described below with reference to the charts.

The micromirror initially operates at an intermediate light state up to the time $t_{17}$, with no voltage applied to the address electrode and/or the micromirror. Thereafter, the micromirror is deflected to the ON light state by applying the voltage to the address electrode and/or the micromirror at the time $t_{17}$. The micromirror is held in the ON light state up to the time $t_{18}$. The micromirror starts to freely oscillate when reducing the voltage of the address electrode and/or the micromirror to 0V at the time $t_{18}$. Then, a lower voltage than that used for the micromirror to deflect from the initial state to the ON light state is timely applied at the time $t_{19}$ when the distance between the ON light side of the address electrode and the micromirror is shorter than the distance between the OFF light side of the address electrode and the micromirror. This takes place when the freely oscillating micromirror is moving away from the ON light side of the address electrode toward the OFF light side of the address electrode, whereby the micromirror can be controlled to deflect to the ON light state. This can be also understood according to the principle described with reference to FIG. 15A. Moreover, a person having ordinary skill in the art can easily understand that a generally called stiction can be prevented from occurring when the micromirror is in contact with the electrode by holding the micromirror at a low voltage.

With the operations described with reference to FIGS. 15A to 15C, the micromirror can be controlled to always deflect to either of the sides of the ON and the OFF light states regardless of the current state such as the ON, the OFF, or the initial state that is the intermediate light state of the micromirror. The control is achieved by applying a lower voltage than that applied in the initial state to the address electrode and/or the micromirror at particular timing. Such a controlling method for changing the applied voltage is also applicable to the controlling method described with reference to FIGS. 6A to 6E.

Figure 15E:
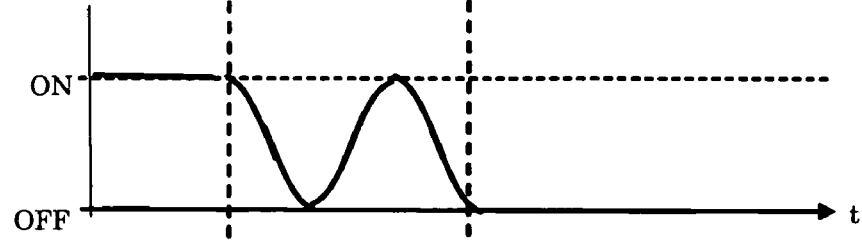
Figure 15E:
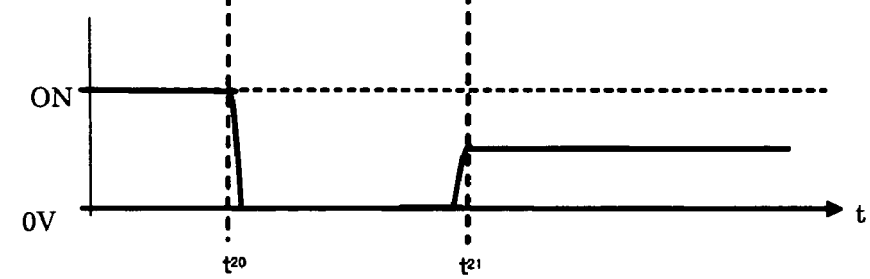

FIG. 15D shows a controlling method for deflecting the micromirror 31 from the ON light state to the OFF light state, and further to the ON light state by applying a multilevel voltage to the address electrode 33 and/or the micromirror 31. A method for controlling the micromirror 31 to deflect from the ON light state to the OFF light state, and further to the ON light state is described with reference to the charts shown in FIGS. 15D and 15E. FIG. 15D shows the state where the micromirror oscillates between the ON and the OFF light states, or with attenuated oscillation. FIG. 15E shows the state where the micromirror fully oscillates between the ON and the OFF light states. A person having ordinary skill in the art can easily understand that the difference between these states varies depending on the initial settings of the strength of the elastic spring force of the mirror element, or the position of a time point t.

In FIGS. 15D and 15E, the micromirror 31 is held in the ON light state up to a time $t_{20}$ by applying the voltage to the address electrode 33 and/or the micromirror 31 after the initial operations described in the second preferred embodiment. The micromirror 31 starts to freely oscillate when reducing the voltage of the address electrode 33 and/or the micromirror 31 to 0V. A voltage lower than that used in the initial state is applied to the address electrode 33 and/or the micromirror 31 at a time $t_{21}$ when the freely oscillating micromirror 31 oscillates closest to the OFF light side of the address electrode 33 to control the micromirror 31 to deflect to the OFF light state.

In this case, the coulomb force F represented by the equation (1) is stronger because of the square of the distance r between the micromirror 31 and the address electrode 33. The voltage as high as that for the initial state is not required because the distance r between the address electrode 33 and the micromirror 31 is shorter than that at the time of the initial operations when the freely oscillating micromirror 31 moves close to the OFF light side of the address electrode 33. Therefore, the micromirror 31 is operated in the OFF light state by applying the voltage lower than that required for the initial state.

In this way, the micromirror 31 is controlled by applying a multilevel voltage to the address electrode 33 and/or the micromirror 31. For example, the micromirror can be held in the ON or the OFF light state by applying a voltage to the address electrode and/or the micromirror is made at least bi-level except for the state where the voltage is not applied, and a voltage is applied at designated timing, whereby.

As described above, the micromirror can be controlled to change to a particular deflection state regardless of the current tilting state of the micromirror. The deflection of the micromirror is also controllable by applying a multilevel voltage to the address electrode and/or the micromirror. Furthermore, the deflection of the micromirror is more conveniently controllable by using the electrode 141 described in the tenth preferred embodiment.

According to the aforementioned preferred embodiments, it is preferable to apply the voltage of 3V to 15V to the micromirror or the electrode as the controlling method executed in one mirror element in the micromirror devices. Moreover, the voltage applied to the micromirror or the electrode may be a constant or multilevel voltage. When a memory circuit for driving to apply a voltage to the electrode has a DRAM configuration, the voltage can be easily adjustable by implementing a charge pump, or the like in a capacitor that is implemented as part of the circuit.

Additionally, when the micromirror and the electrode are implemented as address electrodes, a plurality of memories may be provided for each of the address electrodes.

It may be necessary to consider differences among the deflection speeds and the deflection times of mirror elements caused by variations of the micromirrors especially considering the fact that the micromirrors are controlled with the timing implemented to drive the micromirrors in all the mirror elements. Moreover, the micromirror can be controlled with higher precision when a multilevel voltage is applied to the electrode or by using the method described in the tenth preferred embodiment.

Up to this point, the first to the eleventh preferred embodiments have disclosed the micromirror devices including a plurality of mirror elements supported on a substrate. The micromirror is deflectable in a plurality of directions and supported by an elastic hinge. An address electrode corresponds to the micromirror and has shapes or properties asymmetrical with respect to the deflection axis of the micromirror. A driving circuit for controlling the micromirror is connected to the address electrode to deflect in at least two directions. The micromirror device further includes a plurality of mirror elements supported on a substrate. Each micromirror is deflectable in a plurality of directions and supported by an elastic hinge. The micromirror device further includes address electrode corresponding to the micromirror, and a driving circuit for controlling the micromirror connected to the address electrode to deflect in at least two directions.

This specification has disclosed the exemplary embodiments of the micromirror devices with detail descriptions. However, it is evident that various modifications and changes may be made to these embodiments without departing from the spirit and the scope of the present invention. Accordingly, this specification and the drawings are not to be taken in a limiting sense but to be regarded as specific embodiments.

Additionally, by employing the present invention, the micromirror devices used to provide an image with a hi-definition resolution may be downsized, leading to reductions in size and cost in comparison with conventional devices. Additionally, the micromirrors can be controlled with higher precision than in the conventional devices. Note that the present invention does not preclude the configuration for controlling a single address electrode and a circuit as in the above described preferred embodiments while controlling the ON/OFF light reflected by a micromirror by arranging two address electrodes for one mirror element on a substrate as shown in FIG. 2B, and a configuration implemented by further comprising the electrode and the circuit disclosed by the preferred embodiments. The present invention is applied to the conventional methods for controlling a micromirror to deflect in two directions, whereby the micromirror can be controlled to stop, oscillate, or operates in many different other manners. Moreover, the micromirror can be controlled in a more complicated manner because of more flexible variations of the controlling methods. As a result, the present invention is expected to and is applicable to a face-mounted display, an electric viewfinder, a cinema projection system, etc. Moreover, the present invention has the advantage that the wiring and the configurations of the driving circuits and the address electrodes employed in the configurations according to the present invention are significantly simplified to achieve highly valued economic benefits.

What is claimed is:

1. A micromirror device, comprising:
a plurality of mirrors each supported on an elastic hinge disposed on a substrate for deflecting each of the mirrors to different deflection angles;
an electrode disposed on the substrate and connected to a driving circuit wherein said driving circuit applies a voltage to said electrode to deflect said mirror to said different deflection angles; and
a stopper is disposed on said substrate at a position for contacting and stopping said mirror when said mirror is deflected to a maximum deflection angle, and wherein said driving circuit changes a potential of said mirror or said stopper when said mirror is deflected to said maximum deflection angle and contacts with said stopper.

2. The micromirror device according to claim 1, wherein said driving circuit is further electrically connected to said mirrors via said elastic hinge.

3. The micromirror device according to claim 1, wherein each of said mirrors further has a plurality of said electrodes connected to said drive circuit for driving and deflecting each of said mirrors.

4. The micromirror device according to claim 1, wherein said elastic hinge is composed of a material having a predetermined resistance.

5. The micromirror device according to claim 1, wherein said stopper is composed of a first material and said mirror is composed of a second material wherein when said mirror is deflected to said maximum deflecting angle to contact said stopper thus having a predetermined resistance between said stopper and said mirror.

6. The micromirror device according to claim 1, wherein said drive circuit controls said mirror and said electrode to decrease a coulomb force between said mirror and said electrode when said mirror contacts with said stopper.

7. A micromirror device, comprising:
a plurality of mirrors each supported on an elastic hinge disposed on a substrate for deflecting each of the mirrors to different deflection angles;
an electrode disposed on the substrate and connected to a driving circuit wherein said electrode is disposed at a position on said substrate for contacting and stopping said mirror when said mirror is deflected to a maximum deflection angle, and
said driving circuit changes a potential of said mirror when said mirror is deflected to said maximum deflection angle and contacts with said electrode.

8. The micromirror device according to claim 7, wherein said driving circuit is further electrically connected to said mirrors via said elastic hinge.

9. The micromirror device according to claim 7, wherein each of said mirrors further has a plurality of said electrodes connected to said drive circuit for deflecting and stopping each of said mirrors.

10. The micromirror device according to claim 7, wherein said driving circuit deflects said mirror to contact with said electrode when said mirror is deflected to a nearly horizontal deflection angle substantially in parallel to said substrate.

11. The micromirror device according to claim 7, wherein said mirror is composed of a conductive material for transferring electric charges between said mirror said electrode when said mirror is deflected to contact and stopped by the electrode.

12. The micromirror device according to claim 7, wherein said driving circuit changes a coulomb force applied between said mirrors and said electrode while the mirror is moving toward the electrode.

13. A micromirror device, comprising:
a plurality of mirrors each supported on an elastic hinge disposed on a substrate for deflecting each of the mirrors to different deflection angles;
an address electrode disposed on the substrate for each of said mirrors;
a driving circuit connected to at least one of said address electrodes, and to said mirror via said elastic hinge;
a potential change electrode disposed on the substrate for each of said mirrors, wherein said potential change electrode is disposed at a position on said substrate for contacting and stopping said mirror when said mirror is deflected to a maximum deflection angle; and
said driving circuit changes a potential of at least one of said potential change electrodes and said mirror, and said address electrode in one of said mirrors of said potential change electrode when said mirror makes contact with said potential change electrode.

* * * * *